(12) United States Patent
Saikia et al.

(10) Patent No.: US 12,159,628 B1
(45) Date of Patent: Dec. 3, 2024

(54) NATURAL LANGUAGE INTERACTIONS WITH INTERACTIVE VISUAL CONTENT

(71) Applicant: Amazon Technologies, Inc., Seattle, WA (US)

(72) Inventors: Amitabh Saikia, Mountain View, CA (US); Devesh Mohan Pandey, Redwood City, CA (US); Tagyoung Chung, Sunnyvale, CA (US); Shanchan Wu, Foster City, CA (US); Chien-Wei Lin, Sunnyvale, CA (US); Govindarajan Sundaram Thattai, Fremont, CA (US); Aishwarya Naresh Reganti, San Jose, CA (US); Arindam Mandal, Redwood City, CA (US); Prakash Krishnan, Santa Clara, CA (US); Raefer Christopher Gabriel, San Jose, CA (US); Meyyappan Sundaram, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 17/547,947

(22) Filed: Dec. 10, 2021

(51) Int. Cl.
*G10L 15/183* (2013.01)
*G10L 13/027* (2013.01)
*G10L 15/08* (2006.01)

(52) U.S. Cl.
CPC .......... *G10L 15/183* (2013.01); *G10L 13/027* (2013.01); *G10L 15/083* (2013.01)

(58) Field of Classification Search
CPC .... G10L 15/183; G10L 13/027; G10L 15/083
See application file for complete search history.

(56) References Cited

U.S. PATENT DOCUMENTS

| | | | |
|---|---|---|---|
| 6,510,411 B1 * | 1/2003 | Norton | H04M 3/4936 704/E15.045 |
| 7,373,300 B1 * | 5/2008 | Bangalore | G10L 15/22 704/270.1 |
| 7,668,964 B2 * | 2/2010 | Millington | H04L 65/80 709/248 |
| 7,869,998 B1 * | 1/2011 | Di Fabbrizio | G10L 13/00 704/251 |
| 10,291,722 B1 * | 5/2019 | Mendez | H04L 63/20 |
| 10,854,191 B1 * | 12/2020 | Geramifard | G10L 15/01 |
| 10,977,013 B2 * | 4/2021 | Davidchuk | G06F 8/34 |
| 11,868,680 B2 * | 1/2024 | Lee | G06F 9/4843 |

(Continued)

*Primary Examiner* — Fariba Sirjani
(74) *Attorney, Agent, or Firm* — Pierce Atwood LLP

(57) ABSTRACT

Techniques for facilitating natural language interactions with visual interactive content are described. During a build time, a system analyzes various websites and applications relating to a particular user goal to understand website and application navigation and information relating to the user goal. The learned information is used to store configuration data. During runtime, when a user request performance of an action, the system engages in a dialog with the user to complete the user's goal. The system uses the stored configuration data to determine actions to be performed at a website or application to complete the user's goal, and determines system responses to present to the user to facilitate completion of the goal. Such system responses may request information from the user, may inform the user of information displayed at the website or application, etc.

18 Claims, 16 Drawing Sheets

(56) References Cited

U.S. PATENT DOCUMENTS

| | | | |
|---|---|---|---|
| 2003/0137537 A1* | 7/2003 | Guo | G10L 15/1822 704/E15.04 |
| 2003/0200080 A1* | 10/2003 | Galanes | H04M 1/72445 704/200 |
| 2004/0073431 A1* | 4/2004 | Galanes | G06F 9/451 704/270.1 |
| 2004/0117804 A1* | 6/2004 | Scahill | G06F 9/542 719/320 |
| 2005/0055321 A1* | 3/2005 | Fratkina | G06N 5/042 706/50 |
| 2007/0143485 A1* | 6/2007 | Da Palma | G06Q 10/10 709/227 |
| 2008/0255845 A1* | 10/2008 | Bennett | G06F 40/216 704/E15.047 |
| 2010/0262678 A1* | 10/2010 | Morgan | G06F 16/9535 715/764 |
| 2011/0125734 A1* | 5/2011 | Duboue | G09B 7/00 707/723 |
| 2012/0035935 A1* | 2/2012 | Park | G10L 15/22 704/E21.001 |
| 2012/0253791 A1* | 10/2012 | Heck | G06F 16/9535 704/9 |
| 2012/0254227 A1* | 10/2012 | Heck | G06F 40/30 707/769 |
| 2015/0356136 A1* | 12/2015 | Joshi | G06F 16/9537 707/769 |
| 2017/0147554 A1* | 5/2017 | Chen | G06F 40/35 |
| 2018/0143802 A1* | 5/2018 | Jang | G10L 15/30 |
| 2018/0324115 A1* | 11/2018 | Aggarwal | G06F 40/10 |
| 2019/0278563 A1* | 9/2019 | Pujari | G06F 3/167 |
| 2022/0172722 A1* | 6/2022 | Kim | G10L 15/30 |
| 2022/0293096 A1* | 9/2022 | Mohapatra | G06F 40/279 |
| 2023/0085061 A1* | 3/2023 | Ma | G06N 3/047 706/25 |
| 2023/0297325 A1* | 9/2023 | Millington | H04R 3/12 700/94 |

* cited by examiner

NATURAL LANGUAGE INTERACTIONS WITH INTERACTIVE VISUAL CONTENT

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
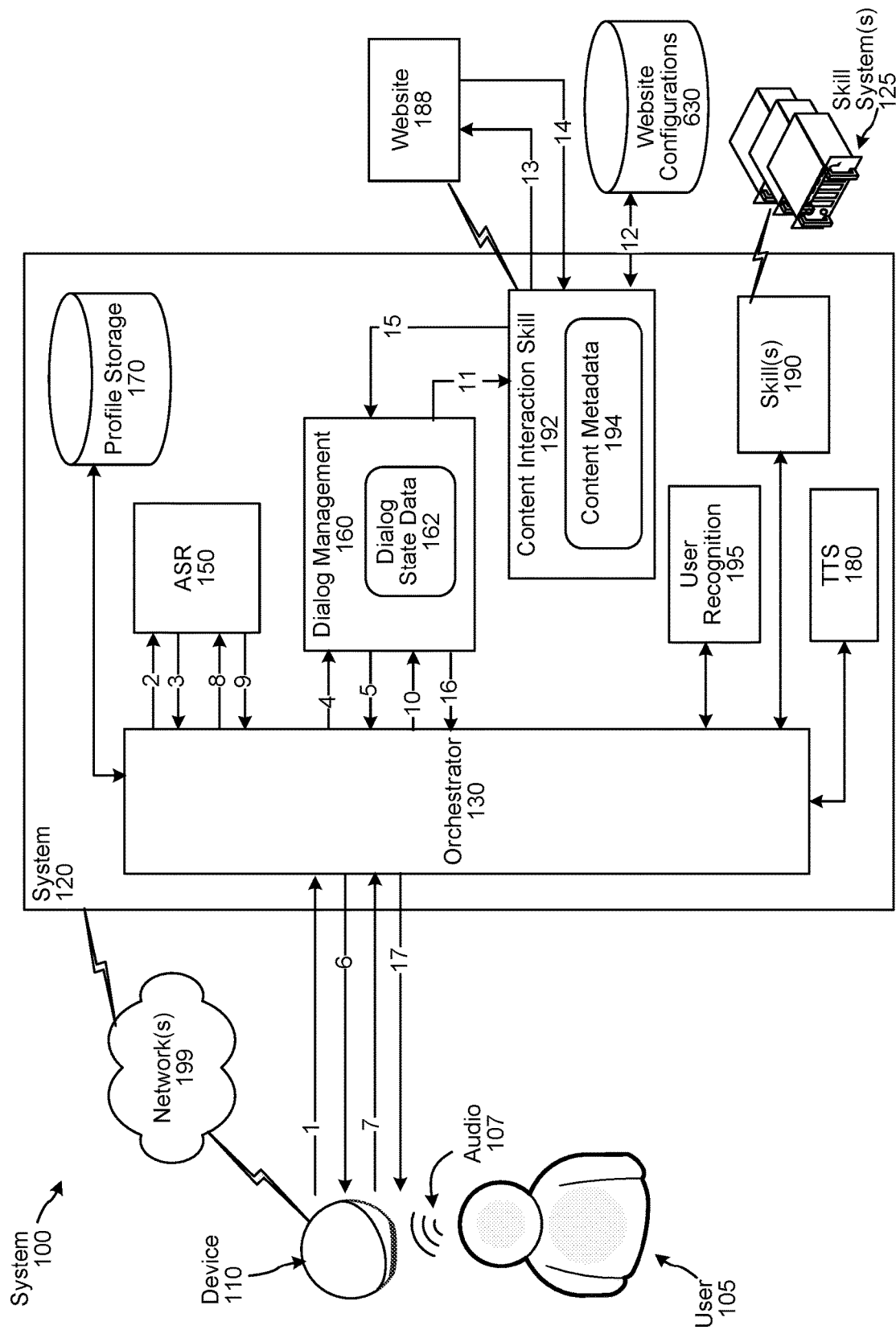
FIG. 1 is a conceptual diagram illustrating an example system for enabling natural language interactions with content, such as, a website, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech. Natural language generation (NLG) can also be used to generate human-understandable outputs representing machine representations of information. The NLG outputs can be shared with human users via TTS, displayed text, or other ways of communicating natural language content to a user.

Dialog processing, as used herein, is a field of computer science that involves communication between a computing system and a human via text, audio, and/or other forms of communication. While some dialog processing may be more transactional, e.g., involving generation of a response given only a most recent input from a user (i.e., single-turn dialog), more complicated dialog processing can involve determining and optionally acting on one or more goals expressed by the user over multiple turns of dialog, such as making a restaurant reservation, booking an airline ticket, or simple having a conversation about a topic (e.g., current events, something in the news, something in history, content, etc.). These multi-turn "goal-oriented" dialog systems can be configured to recognize, retain, and use information collected during more than one natural language inputs/outputs during a back-and-forth or "multi-turn" interaction with the user.

The system may be configured to respond to the user across multiple exchanges between the user and the system. For example, the user may say to the system "Book a hair salon appointment" and the system may respond "which hair salon would you like to visit?" The user may respond "something nearby" and the system may respond "okay, [hair salon] is 10 minutes away?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play, what reservation to make, what piece of content to select, etc.). Alternatively, a dialog may not be goal-oriented, for example as part of a freeform conversation between the system and a user that may not have a definite end point or action in mind at the end of the conversation. System components that control what actions the system takes in response to various user inputs of a dialog may sometimes be referred to as chatbots.

A user input and performance by the system of a corresponding action, responsive to the user input, may be referred to as a dialog "turn." A session identifier may be associated with multiple related turns corresponding to consecutive related user inputs. One user input may be considered related to a subsequent user input, thereby causing a single session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the session identifier or other data to track the progress of the dialog to select system responses in a way that tracks the previous user-system exchanges, thus moving the dialog along in a manner that results in a desirable user experience.

Often users interact with websites, apps, and other types of interactive visual content to complete certain goals. Some systems enable users to interact with websites using spoken inputs. However, such systems can be limited in the particular inputs that it can process based on how the developer programs the website or other integration code (e.g., skills or other type of application), which limits how the user interacts with the website using speech. For example, some such systems may only enable inputs relating to navigating a website (such as, "go back", "click on [button]","enter [zip code]", "click on find locations", "select first option", etc.), and the system may perform the indicated navigational actions at the website. As such, in some cases the user may be required to view the website while providing the spoken inputs.

The present disclosure relates to techniques for enabling a user to have conversational interactions with content, such as a website, where the user can provide natural language inputs to complete a website-specific goal, instead of generic inputs applicable to all websites (such as to navigate a website or use common a web browser functionality), without having to view the website. For example, a system of the present disclosure may be configured to process and respond to user inputs such as "Are there any haircut appointments available at [hair salon]?", where the system may access a website of the indicated hair salon, and perform actions to navigate the website to determine available appointments without the hair salon's website developer needing to write/provide any website-specific voice interface code or functionality. In the process of determining available appointments, if additional information is needed from the user, such as, a stylist name, specific location, etc., the system presents a natural language output requesting the additional information. The system can present synthesized speech outputs and/or display outputs (e.g., text, graphics, images, etc.), without necessarily displaying the website itself, based on how the website updates after the system performs the navigational actions.

The present disclosure describes techniques for understanding a website's and other interactive visual content's structure, learning entities included in the content (first name, business name, address, product details, services/goods offered, stylist, etc.), and generating a dialog that simulates how a user may converse with the website and content. The generated dialogs can be task-oriented and the system can include multiple dialogs for a given website. Understanding of the content and website and generation of a dialog can be performed without the content owner's involvement.

The system of the present disclosure may use a dialog management component for managing and tracking the user's natural language input for content that may be presented, for example, via a website. The dialog management component may be configured for various domains, where each domain may relate to a particular goal/task that a user may want to perform. For example, one domain may be hair service appointments, another domain may be car parking reservation, another domain may be food delivery services, and the like. The dialog management component may use domain-specific information to predict an action corresponding to a natural language user input, predict arguments to be used for the action, generate a natural language response, etc.

The dialog management component may be configured to invoke, for example, a content interaction skill component to perform actions with respect to some content that may be presented at a website in response to the natural language user inputs. The content interaction skill component may be configured to handle interactions with a wide variety of websites and content relating to various goals. The content interaction skill component may be configured to track content metadata, such as a website state based on actions performed at the website. For example, based on entering an input at the website, the website may display other information, and the content interaction skill component may update website state data to include the displayed other information. The updated website state data may be provided to the dialog management component, which may determine an appropriate system response based on the website state data and the dialog for completing the goal.

The system of the present disclosure may maintain at least two types of states for facilitating a natural language dialog interaction with content. One of these states is a dialog state, which may be maintained by the dialog management component. The dialog state may include data corresponding to a user input during the dialog session, data corresponding to a system response during the dialog session, an action predicted to be performed in response to a user input, one or more arguments/entities to be used to perform the predicted action, and other data described herein. The other state is content metadata, such as a website state, which may be maintained by the content interaction skill component. The content metadata may include data representing actions taken at a website or with respect to content, data representing a website response to the taken actions, etc. The website state, included in the content metadata, may track website navigation performed by the content interaction skill component, so that interactions with the website result in completion of a goal.

Teachings of the present disclosure provide, among other things, an improved user experience at least by facilitating natural language interactions with a website to complete a goal. Additionally, the present disclosure enables a user to interact with a website without having to view the website.

Teachings of the present disclosure may be configured to incorporate user permissions and may only be performed if approved by a user. For example, the system may interact with a website after the user provides permission to do so. As another example, the system may process a website to generate a dialog after the website owner provides permission to do so. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

As used herein, a "skill" may refer to software, that may be placed on a machine or a virtual machine (e.g., software that may be launched in a virtual instance when called), configured to perform one or more actions that are responsive to a user input. What is referred to herein as a skill may sometimes be referred to as an application, bot, action, or the like.

As used herein, a "domain" may refer to a group of functionalities relating to a goal. For example, one domain may be a hair salon domain, which may enable a user to book appointments for various hair services. As another example, another domain may be a vehicle parking domain, which may enable a user to reserve a parking spot for a vehicle. As yet another example, a food delivery service domain may enable a user to order food for delivery. Other example domains may be a car rental domain, a hotel reservation domain, a restaurant reservation domain, etc. A domain, in some embodiments, may correspond to a goal that can be completed using a website.

FIG. 1 is a conceptual diagram illustrating an example system 100 for enabling natural language interactions with a website, in accordance with example embodiments. As shown in FIG. 1, the system 100 may include a device 110, local to a user 105, connected to a system 120 across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech-based dialog management system configured to process spoken natural language inputs. The system 120 may include multiple components to facilitate speech processing, such as, an orchestrator component 130, an ASR component 150, a dialog management component 160, and a content interaction skill component 192. The system 120 may include one or more other skill components 190, which may be in communication with a skill system(s) 125 external to the system 120. The system 120 may also include, as described later herein, a profile storage 170, a TTS component 180, and a user recognition component 195 to facilitate processing of users inputs and generating outputs.

To enable natural language interactions with a website to complete a goal, the system 100 includes a content interaction skill component 192, which may use website configuration data that is created during a build process (described herein in relation to FIGS. 6-13) and may provide information on how different web actions, with locations within a DOM tree for a website, can be performed to gather or enter information. Although FIG. 1 shows the system 120 including the content interaction skill component 192, in some embodiments, the content interaction skill component 192 may be implemented at a separate/different system, such as, the skill system 125.

Referring to FIG. 1, the user 105 may speak an input, and the device 110 may capture audio 107 representing the spoken user input. For example, the user 105 may say "Alexa, I want to book a haircut appointment" or "Alexa, can you reserve a parking spot?" In other examples, the user 105 may provide another type of input (e.g., selection of a button, selection of displayed graphical interface elements, may perform a gesture, etc.). The device 110 may send (step 1) audio data (or other type of input data, such as, image data, text data, etc.) corresponding to the user input to the system 120 for processing.

The orchestrator component 130 may receive the input data from the device 110. In the case that the input data is audio data, the orchestrator component 130 may send (step 2) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component 150 may send (step 3) the ASR data to the orchestrator component 130.

The orchestrator component 130 may send (step 4) the ASR data to the dialog management component 160. In the case the input data is other than audio data, the orchestrator component 130 may send the input data to the dialog management component 160 or another component (not shown) for processing.

Based on receipt of the ASR data (or other input data) and at least in part on determining that the instant user input corresponds to a new dialog, the dialog management component 160 may initiate a dialog session to track the current dialog. The dialog management component 160 may associate the ASR data (or other input data) with a dialog session identifier for the dialog session. The dialog management component 160 may also store dialog state data 162 for the current dialog session, where, at this point, the dialog state data 162 includes the ASR data. The dialog state data 162 may be updated as a system response is generated for the user input and as additional turns of the dialog take place.

Before receiving the ASR data or in parallel of receiving the ASR data, another component (not shown) of the system 120 may process the ASR data and other data to determine a domain corresponding to the user input. This component may be configured to perform domain classification techniques and may implement one or more machine learning models (trained models). For example, the component may determine that the user input "Alexa, book a haircut appointment" corresponds to a hair salon domain. As another example, the component may determine that the user input "Alexa, can you reserve a car parking spot?" corresponds to a vehicle parking domain. The dialog management component 160 may receive an indication (e.g., a domain name, an alphanumerical identifier for the domain, etc.) of the domain corresponding to the user input.

The dialog management component 160 may include one or more components configured to process the ASR data and other data to determine an action to be performed in response to the user input. Such components and processing are described in detail below in relation to FIG. 3.

Based on the domain corresponding to the user input, the dialog management component 160 may use one or more domain-specific dialog flow models to determine the action responsive to the user input. Such actions may relate to one of three categories/types: (1) invoke a skill component to perform an action, (2) request more information from the user (e.g., for argument filling), and (3) inform the user of the action being performed or confirm that the action has been performed. In the non-limiting example, where the user input is "Alexa, book a haircut appointment," the dialog management component 160, based on processing using dialog flow models for the hair salon domain, may determine that the responsive action is to request more information, in particular, regarding the hair salon the user is interested in. In another non-limiting example, where the user input is "Alexa, can you reserve a car parking spot?", the dialog management component 160 may determine that the responsive action is to request more information regarding the car parking service/website the user wants to use.

Figure 3:
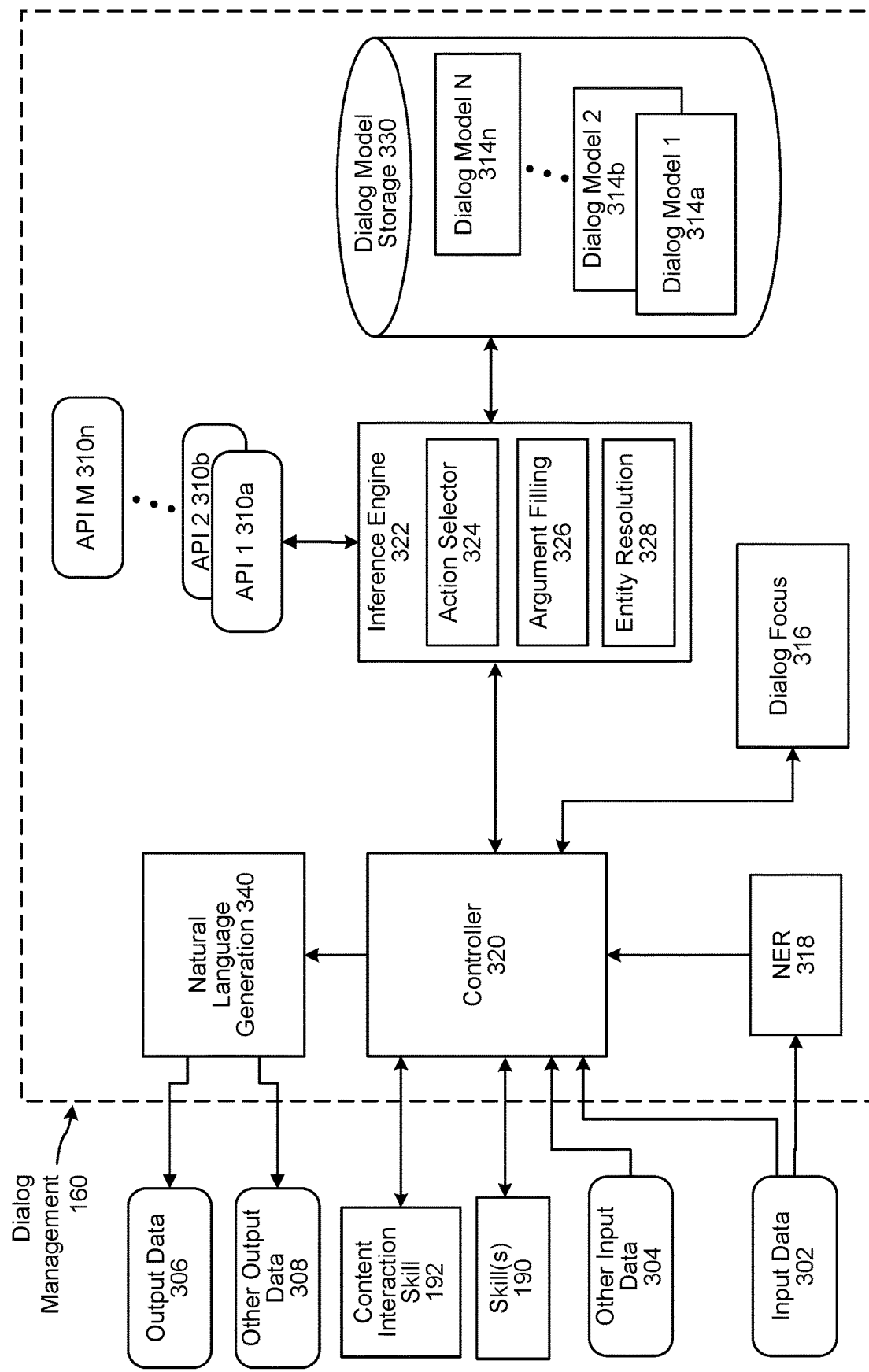
FIG. 3 is a conceptual diagram illustrating an example dialog management component, according to embodiments of the present disclosure.

Assuming that the action responsive to the user input (received in step 1) is to request more information, the dialog management component 160 may generate a natural language output (using a natural language generation (NLG) component 340 shown in FIG. 3) requesting the information needed. The dialog management component 160 may update the dialog state data 162 to include the determined action and/or the natural language output. The dialog management component 160 may send (step 5) the natural language output to the orchestrator component 130, which may send (step 6) the natural language output to the device 110 to present to the user 105. In some cases, the orchestrator component 130 may send the natural language output to the TTS component 180 to determine output audio data representing synthesized speech corresponding to the natural language output, and the orchestrator component 130 may send (step 6) the output audio data to the device 110.

In response to the natural language output, the user 105 may provide an additional spoken input. The device 110 may capture and send (step 7) audio data corresponding to the additional spoken input to the orchestrator component 130. The orchestrator component 130 may send (step 8) the audio data to the ASR component 150 for processing, and the ASR component 150 may determine and send (step 9), to the orchestrator component 130, second ASR data corresponding to the additional spoken input.

The orchestrator component 130 may send (step 10) the second ASR data to the dialog management component 160, which may be associated with the dialog session identifier for the current dialog session. The dialog management component 160 may update the dialog state data 162 to include the second ASR data. The dialog management component 160 may process the second ASR data and the dialog state data, using the dialog flow models, and determine that a system response is to be invocation of the content interaction skill component 192. As part of the processing, the dialog management component 160 may determine one or more entities/arguments corresponding to the current dialog session, and may update the dialog state data 162 to include the determined entities. For example, the additional spoken input from the user 105 may include a name of a hair salon or a name of the car parking website. The dialog state data 162 may be updated to include the hair salon name or the car parking website.

The dialog management component 160 may send (step 11) an API request to the content interaction skill component 192, where the API request may include the dialog state data 162. Alternatively, the API request may include specific arguments, such as, a website to interact with, which may be based on information provided by the user 105, along with an action to be performed (e.g., BookAppointment, FindLocation, FindWaitTime, etc.). The API request may also include an indication of the goal to be completed (e.g., scheduling of a haircut appointment, booking of parking spot reservation, etc.).

Based on the API request, the content interaction skill component 192 may determine a website 188 to interact with. The website 188 may be hosted by another system/server external to the system 120, and the content interaction skill component 192 may communicate with the website 188 over the network(s) 199. Based on receiving the API request and at least in part on determining that this is a new website interaction session, the content interaction skill component 192 may initiate a website interaction session to track interactions with the website 188. The content interaction skill component 192 may associate an interaction session identifier with the API request, and may initiate storing of content metadata 194, which in some embodiments, may be website state data for the current website interaction session. The content interaction skill 192 may store an indication (e.g., website name, website URL, an alphanumerical identifier for the website, etc.) of the website 188 in the content metadata 194 based on determining to interact with the website 188. The content interaction skill component 192 may determine the website 188 based on data stored in a website configuration data storage 630, which may indicate a task that can be performed by a respective website, the website's URL, a name (e.g., business name, organization name, website name, etc.) associated with the website, etc. Based on the user 105 indicating a hair salon name or a car parking company name and using the website configuration data storage 630, the content interaction skill component 192 may determine the specific website 188 as relating to the dialog session and user goal.

The content interaction skill component 192 may retrieve (step 12) website configuration data corresponding to the website 188 from a website configurations storage 630. The website configurations storage 630 may store website configuration data associated with various websites and identified by the respective website's identifier. The website configuration data, for the website 188, may include a navigation sequence that can be used to complete a goal using the website 188. Such navigation sequence may indicate web actions (e.g., click, select, type, etc.) to be performed, web elements to be interacted with (e.g., button, drop down list, web page, text field, etc.), web pages to access (e.g., URL for a web page of the website), and information to be inputted to complete the goal (e.g., phone number, zip code, etc.). Using the website configuration data, the content interaction skill component 192 may determine one or more actions to be performed with respect to the website 188. Such actions may facilitate completion of the goal indicated by the user 105 and represented in the dialog state data 162 or included in the API request (of step 11).

The content interaction skill component 192 may identify a web action, from the website configuration data, corresponding to the action indicated in the API request from the dialog management component 160. As described herein, the website configuration data may include data associating a dialog action (such as ones that may be received from the dialog management component 160), one or more web actions, a navigation sequence, and one or more entities. For example, a dialog action BookAppointment may be associated with the following navigation sequence, web actions (indicated in { }) and entities (indicated in " "): (1) {Click} "Location"; (2) {Select} "Location"; (3) {Click} "Request Appointment"; (4) {Type} "Date"; (5) {Select} "Time"; (6) {Click} "Submit". Based on the dialog action being BookAppointment, the content interaction skill component 192 may determine the first web action to be {click} "Location."

The content interaction skill component 192 may first take action to access the website 188, for example, by launching the website 188 in a browser, entering the URL for the website 188 in a browser, etc. In some embodiments, the content interaction skill component 192 may use a browser automation API to access the website 188.

Then, the content interaction skill component 192 may cause (step 13) performance of the determined actions at the website 188. For example, if the action is to click on the "Locations" button, then the content interaction skill component 192 may click on the "Locations" button on a web page of the website 188. As another example, the content interaction skill component 192 may cause the action of selecting a service (e.g., "haircut" indicated in the first user input from the user 105) from a drop down menu.

In response to performance of the action (at step 13), the website 188 may update to present, what is referred to herein as, a website response. For example, based on clicking the "Locations" button, the website 188 may show a list of locations or may present a text field to enter a zip code. As another example, based on selecting a service from a drop down menu, the website 188 may list available appointments. The content interaction skill component 192 may determine (step 14) the website response to the performed action, and may update the website state data in the content metadata 194 to include the website response (associated with the interaction session identifier for the current website interaction session). For example, the website state data may include the list of locations, the zip code text field, or the list of available appointments. In some cases, a website's URL changes when an updated web page is presented. The website state data may also include a URL for the website 188 presenting the website response.

The content interaction skill component 192 may send (step 15) data representing the website response to the dialog management component 160. Based on the website response and the dialog flow models, the dialog management component 160 may determine a system response. For example, if the website response is displaying a list of locations or a list of available appointment times, the content interaction skill component 192 may send text data representing the list. As another example, if the website response is displaying a text field labeled "zip code", the content interaction skill component 192 may send text data representing "zip code."

In some embodiments, the content interaction skill component 192 may interact with the website 188 using various methods, such as, SMS/MMS messaging, chat bot, phone call, etc. For example, the website 188 may have a chat feature where inputs may be typed, and the website 188 may present a response to the typed inputs. The content interaction skill component 192 may enter inputs in the chat (e.g., "I would like a haircut appointment"), and may provide, as the website response data, the response presented in the chat (e.g. "Glad to help! Which date would you like it for?"). As another example, the website 188 may have a messaging feature, and the content interaction skill component 192 may send SMS/MMS messages to complete the user goal. In yet another example, the content interaction skill component 192 may automatically call a business/organization of the website 188 to complete the user goal, and the content interaction skill component 192 may use TTS processing (e.g., using the TTS component 180) to "speak" over a phone call.

The dialog management component 160 may update the dialog state data 162 to include the website response. The dialog management component 160 may determine a system response based on the website response and using the dialog flow models. For example, based on the website response being a list of locations or a list of available appointments, the dialog management component 160 may determine the system response as to inform the user 105 of the website response. As such, the dialog management component 160 may generate output data including the list of locations or the list of available appointments. As another example, based on the website response being a "zip code" input field, the dialog management component 160 may determine the system response as a request for a zip code. The determined system response and any corresponding output data may be used to determine a natural language output to present to the user 105.

The dialog management component 160 may determine another natural language output (using the NLG component 340), and may send (step 16) the natural language output to the orchestrator component 130. The orchestrator component 130 may send (step 17) the natural language output to the device 110 to present to the user 105. In some cases, the orchestrator component 130 may send the natural language output to the TTS component 180 to determine output audio data representing synthesized speech corresponding to the natural language output, and the orchestrator component 130 may send (at step 17) the output audio data. In some cases, the dialog management component 160 may also generate and send other output data that may include text, graphics, images, etc. For example, the other output data may be text or image data representing the list of the locations displayed at the website 188 or the list of the appointments displayed at the website 188. Such other output data may be accompanied with the following synthesized speech "Here are the locations" or "These are the available appointments." The output may further include a request for further information to complete the goal. For example, the output may include the following synthesized speech "Which location are you interested in?" or "Do you want to book any of the available appointments?"

The type of output data presented to the user 105 may depend on the device type of the device 110. For example, if the device 110 does not have a display screen, then the output data may only include synthesized speech, and may not include displayable outputs, such as, text, graphics, images, etc. For example, the device 110 may output synthesized speech indicating the locations or available appointments displayed at the website 188.

Further dialog turns may take place to complete the user's goal. The user 105 may provide further user inputs, the system may perform further interactions with the website 188, and the system may determine further system responses based on the interactions with the website 188. The dialog state data 162 and the content metadata 194 may be updated accordingly. Once the user's goal is completed, the system may end the dialog session and the website interaction session, which may involve discarding/deleting the dialog state data 162 (corresponding to the dialog session identifier for the current dialog session) and the content metadata 194 (corresponding to the interaction session identifier for the current website interaction session). Any user inputs, received subsequent to the dialog/interaction session ending, may cause the system to initiate a new dialog session and a new website interaction session.

Each dialog session is associated with a separate session identifier so that different user's information and dialog interactions can be kept separate and used to maintain stateful connections with the websites per dialog session. Use of the website configuration data enables extension of the system to facilitate interactions with various different websites for completing various different goals.

In this manner, the system 100 uses a component(s) (e.g., the content interaction skill component 192) to facilitate communications between the dialog management component 160 and websites. The system 100 uses a component(s) that is configured to communicate with different websites and that services all domains, goals and websites.

As used herein, an entity determined by the dialog management component 160 may be used as an argument/input for an action. An entity included/represented on a website may be a label for an input field (e.g., a text input field, a drop down menu, a radio button selection, etc.), a button label/name (e.g., "Locations"), a label/name of a tab/web page, a title (or other text), etc. Entities may be persons, places, things, etc.

In some embodiments, using techniques similar to the ones described herein in relation to website interactions, the system 100 may enable natural language interactions with interactive visual content that may not be presented via a website. Such content (e.g., content 280 shown in FIG. 2) may be presented via an application, an app, etc., and may include, but is not limited to, emails, meeting requests, books, tickets, travel itineraries, magazines, etc. The content 280 may be presented via an email application, a project collaboration application, an electronic book application, a travel application, etc., which may be provided/hosted by a system external to the system 120/device 110. In some embodiments, the content 280 may be included on the device 110 or the system 120.

In enabling natural language interactions with the content 280, the system 100 may receive and process a natural language input requesting action to be performed with respect to the content 280. For example, the user 105 may say "Alexa, what is the new email about?" and the device 110 may send audio data representing the spoken input to the system 120 for processing. The dialog management component 160 may determine that the spoken input requests performance of an action with respect to an email presented via an email application. The email application may be associated with the user profile for the user 105. The dialog management component 160 may send a command to the content interaction skill component 192 along with an identifier for the email application, action GetInformation or GetEmailSubject, and entity data "new email." The content interaction skill component 192 may interact with the email application to perform an action, e.g., "read" the new email, and the email application may send data representing the subject and/or email body of the new email to the content interaction skill component 192. The content interaction skill component 192 may update content metadata 194 for this interaction session to include the data received from the email application. Based on data stored at a content configurations data storage 625 (shown in FIG. 6), the content interaction skill component 192 may determine the action to be performed at the email application, and may also determine response data to send to the dialog management component 160. The response data, in this example, may be the email subject or a summary of the email body. The content configurations data storage 625 may store information on how an email is structured, what kind of actions can be performed with respect to an email application, API requests that can sent to an email application, a sequence of actions that need to be performed to complete a goal, etc. For example, if the user goal is to learn about a newly received email, the sequence of actions that may need to be performed at the email application may be (1) retrieve unread email messages; (2) order unread email messages by date/time of receipt; (3) select the most recent unread email message; and (4) send subject and email body of the selected email message. The content interaction skill component 192 may send multiple separate commands to the email application based on the example sequence of actions to retrieve information on the "new email" requested by the user 105. The dialog management component 160 may receive the response data from the content interaction skill component 192, and may generate a natural language response, such as, "the email is requesting a meeting with you tomorrow." In some embodiments, the email subject and/or summary of the email body may be displayed via the device 110. In response, the user 105 may say "who is it from?", and the dialog management component 160 may determine an action and entities/argument data based on tracking previous turns of the dialog, and may send action data and entity data to the content interaction skill component 192. In a similar manner as above, the content interaction skill component 192 may retrieve the name of email sender, and the system 120 may output a natural language response "the email is from [sender name]."

Figure 2:
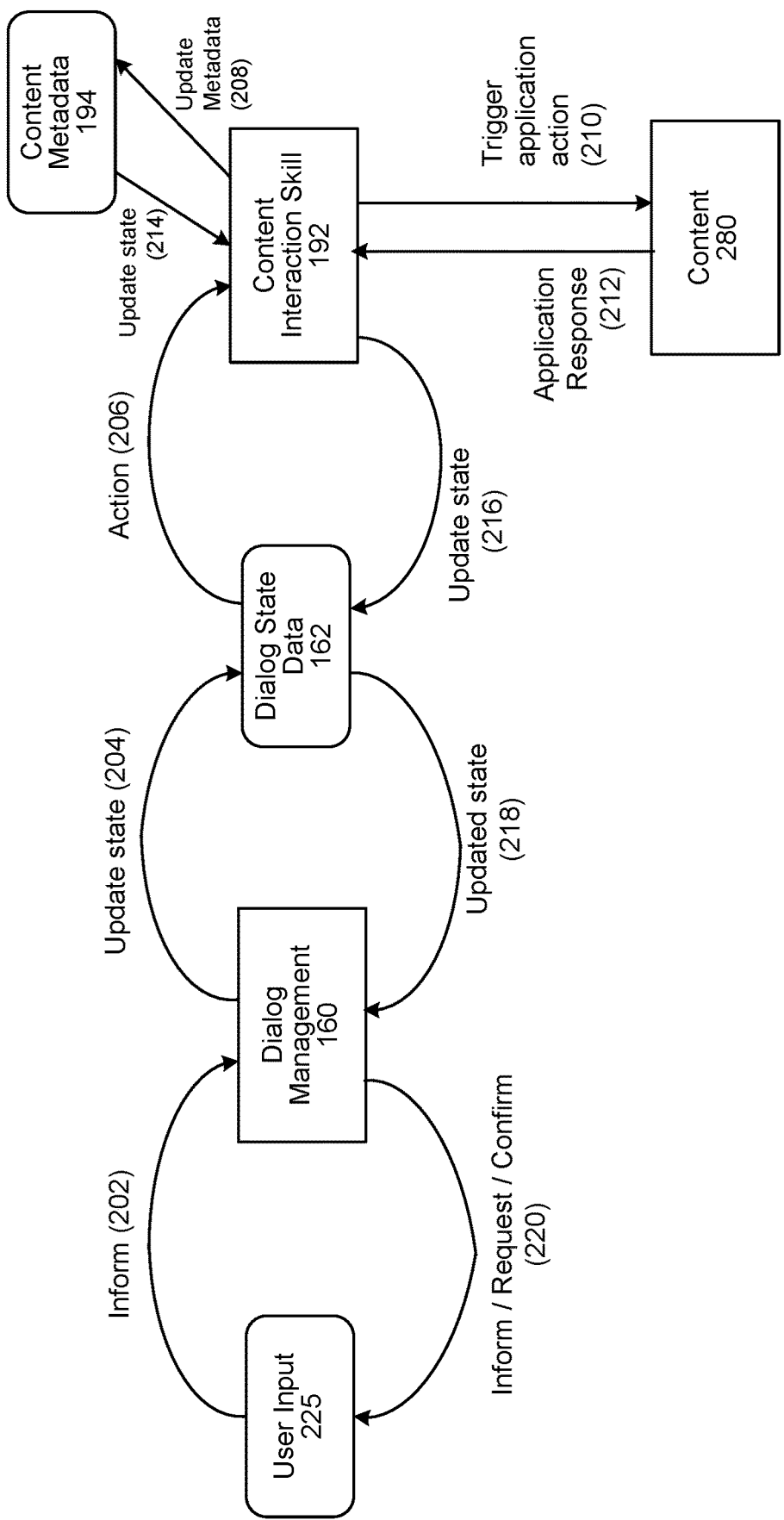
FIG. 2 is a conceptual diagram illustrating data flow between system components to enable natural language interactions with content, according to embodiments of the present disclosure.

FIG. 2 conceptually illustrates a process flow between system components to enable natural language interactions with a website, according to embodiments of the present disclosure. The system may receive a user input 225, which may be a spoken input, selection of graphical user interface element, a gesture input, etc. The system may inform (202) the dialog management component 160 of the receipt of the user input 225. Based on the user input 225, the dialog management component 160 may update (204) a dialog state included in the dialog state data 162. After updating the dialog state data 162, the system may send (206) an action to the content interaction skill component 192, where the action is to be performed with respect to content 280 (which may include the website 188 shown in FIG. 1). The content interaction skill component 192 may update (208) the content metadata 194, and may trigger (210) an application action at the content 280, where the application action may be based on the action received from the dialog management component 160. The content 280 may send (212) an application response corresponding to the application action to the content interaction skill component 192, and the content metadata 194 may be updated (214), by the content interaction skill component 192, to include the content response. The content interaction skill component 192 may send data based on the content response to the dialog management component 160 which may cause the dialog state data 162 to update (216). Based on the updated dialog state data 162, the dialog management component 160 may receive the updated state (218) and determine a system response. The dialog management component 160 may present (220) an output in response to the user input 225, where the output may relate to informing the user of the content, requesting the user provide additional information needed to complete the goal, or confirming performance of an action by the system.

As used herein, a web action may be an application action, as in the web action may be performed at a browser application used to access the website 188. An application action may also include actions performed at an application (e.g., an email application, a travel application, etc.) used to access the content 280.

As described herein, the system 120 may use the dialog management component 160 for managing and tracking a dialog session. The dialog management component 160 may be configured for various domains, where each domain may relate to a particular goal/task that a user may want to perform. For example, one domain may be hair service appointments, another domain may be car parking reservations, another domain may be food delivery services, and the like. The dialog management component 160 may use domain-specific information to predict an action corresponding to the user input, predict arguments for the action, generate a natural language response, etc.

The dialog management component 160 may be configured to invoke the content interaction skill component 192 to respond to the user input. The content interaction skill component 192 may be configured to handle interactions with a wide variety of websites relating to various goals. In invoking the content interaction skill component 192, the dialog management component 160 may send an indication of which domain the user input corresponds to, so that the content interaction skill component 192 may use the appropriate data from the content configuration storage 625 and the website configuration storage 630.

In example embodiments, the content interaction skill component 192 may implement components that can be used to interact with various websites and applications for various actions. For example, the content interaction skill component 192 may implement one processing component capable of entering inputs at websites, another processing component capable of selecting an input from a drop down menu, another processing component capable of clicking on a button, etc.

The content interaction skill component 192 may be configured to track the website state based on actions performed at the website. For example, based on entering an input at the website, the website may display other information, and the content interaction skill component 192 may update the website state to include the displayed other information. The content interaction skill component 192, using the website configurations storage 630 and based on the current website state, may determine a next action to be performed to complete the goal. The content interaction skill component 192 may send an indication of the next action to the dialog management component 160, which in turn may generate an appropriate natural language response to present to the user. In some cases, the content interaction skill component 192 may determine more than one actions to be performed to complete the goal, and may send an indication of the all the determined actions to the dialog management component 160 to generate and present natural language responses to the user accordingly. For example, the content interaction skill component 192 may determine that to schedule a hair appointment, a hair salon location, a hair service and a desired day need to be inputted at the website 188; such inputs may be identified as entities. The content interaction skill component 192 may send data representing the identified entities, and the dialog management component 160 may generate and present natural language outputs requesting information for these entities (e.g., "Which hair salon location would you like to visit?", "What kind of hair service are you looking for?", "Which is the best day for an appointment?", "Which location and what kind of hair service would you like?" or the like). Alternatively, if the dialog state data 162 includes information relating the identified entities, then the dialog management component 160 may communicate that information to the content interaction skill component 192. Information relating to the identified entities may be determined from a user profile for the user 105 stored at the profile storage 170. Such user profiles may store user preferences (e.g., preferred hair salon), user calendar (e.g., already scheduled appointments), user location, user historic interactions (e.g., previously visited hair salon, previously requested hair service, etc.), and other information relating to the user. The dialog management component 160 may determine information relating to an entity from the user profile, and may confirm the information with the user 105 before communicating it to the content interaction skill component 192 to input at the website 188. For example, the system may output "Your calendar is open for Wednesday. Would you like to look for an appointment for Wednesday?", "Would you like to visit your preferred location of [address]?", "Do you want an appointment for a hair coloring service?", and the like.

The content interaction skill component 192 may also be configured to determine an action to be performed in response to, what is referred to herein as, failure conditions that may occur when interacting with the website. One example failure condition may be a pop-up window that is not necessary to complete the goal. The content interaction skill component 192 may take action to dismiss the pop-up window. Another example failure condition may be an error loading a web page, in response to which, the content interaction skill component 192 may attempt to refresh or reload the web page for a certain number of times or a certain time period, and if the web page does not load after such attempts, then the content interaction skill component 192 may determine the action as to inform the user of the error. The content interaction skill component 192 may send data representing the determined action to the dialog management component 160, which in turn may generate an appropriate natural language response to present to the user.

There are at least two types of states maintained by the system 100 for facilitating a natural language dialog interaction with a website. One of these states is a dialog state, which may be maintained by the dialog management component 160. The dialog state may include data corresponding to user inputs received during the dialog session, data corresponding to system responses output during the dialog session, actions predicted to be performed in response to user inputs, one or more arguments/entities to be used to perform the predicted actions, and other data described herein.

The other state is a website state, which may maintained by the content interaction skill component 192. The website state may include data representing actions taken at the website, data representing a website response to the taken actions, etc. The website state may track website navigation performed by the content interaction skill component 192, so that interactions with the website result in completion of the goal.

FIG. 3 is a conceptual diagram illustrating example components of the dialog management component 160, according to embodiments of the present disclosure. The dialog management component may include a NER component 318, an inference engine 322, a controller component 320, a dialog focus component 316, and a natural language generation (NLG) component 340.

The dialog management component 160 receives input data 302. The input data 302 may include text data, token data, or ASR output data (one or more ASR hypotheses, each including text data or token data, and a corresponding confidence score) corresponding to a user input provided by the user 105. The input data 302 may be data representing words, instructions, markup language, speech, or gestures, or may be a vector or other representation of the same. The input data 302 may be generated by a user via a keyboard, touchscreen, microphone, camera, or other such input device associated with the device 110. In other embodiments, the input data 302 is generated by the ASR component 150, as described herein, from audio data corresponding to a spoken input received from the user 105.

The dialog management component 160 may receive other input data 304, which includes data indicating further information about the user input, such as the profile identifier for the user 105, an emotional state of the user, device information (e.g., device type, device location, device capabilities, etc.) for the device 110, etc.

As described in greater detail below, using the input data 302 and/or other input data 304, the dialog management component 160 may determine output data 306 and/or other output data 308. The dialog management component 160 may instead or additionally perform an action based on the input data 302 and/or other input data 304, for example, by calling one or more APIs 310.

The NER component 318 may perform NER processing to identify words in the input data 302, which may be ASR output data or text data, as subject, object, verb, preposition, etc. based on grammar rules and/or machine learning models. The NER processing may then involve searching corresponding fields in a lexicon, attempting to match words and phrases in the input data 302, that NER processing tagged as a grammatical object or object modifier, with those identified in the lexicon.

NER processing may include semantic tagging, which is the labeling of a word or combination of words according to their type/semantic meaning. NER processing may include parsing the input data 302 using heuristic grammar rules, or a model that may be constructed using techniques such as hidden Markov models, maximum entropy models, log linear models, conditional random fields (CRFs), and the like. For example, NER processing of a user input "play [song name] by the [artist]" may determine {Verb}: "Play," {Object}: "[song name]," {Object Preposition}: "by," and {Object Modifier}: "the [artist]."

In some embodiments, the NER component 318 may identify the words in the input data 302 based on a skill component 190 that is in focus for the dialog session. For example, the NER component 318 may identify "Play" as a verb based on a word database associated with a music skill component, when the music skill component is the skill component that most recently processed with respect to the dialog session.

An output of the NER component 318 may be entity data including one or more words from the input data 302, each word tagged with an entity type (e.g., verb, object, subject, etc.).

The NER component 318 may include a ranker component. The ranker component may assign a particular confidence score to each entity data outputted. The confidence score of the entity data may represent a confidence of the NER component 318 in the processing performed with respect to the input data 302. The confidence score of a particular entity data may be affected by whether there are unfilled slots (unidentified words from the input data 302).

The controller component 320 may be configured to manage requests and data for the dialog management component 160. The controller component 320 may receive the other input data 304, and may send the other input data 304 to the dialog focus component 316, the inference engine 322, and/or the NLG component 340 for processing.

In some embodiments, a single NER component 318 may be used for multiple different groups of skills (e.g., different domains of skills) (i.e., a "cross-domain" NER component 318). In other embodiments, a different NER component 318 may be used for each different group of skills (different domains). One or more candidate skills corresponding to the input data 302 may be determined and NER components 318 corresponding to the candidate skills may be used to process the input data 302. A dialog focus component 316 may store the output entities from each candidate skill NER component and may remove unselected entities when a dialog model 314 is selected.

The controller component 320 may send the entity data from the NER component 318 to the dialog focus component 316.

The dialog focus component 316 that may store context data relating to a dialog session that can be used to determine a system response to a user input. The dialog focus component 316 may store dialog state data corresponding to dialog history data, action history data, and/or other data. The dialog history data may correspond to one or more user inputs provided by the user 105 during the current dialog session, and one or more system responses generated in response to the user inputs. The dialog history data may be text data, token data, or ASR data for the user inputs, and may be text data or other natural language data for the system responses. The action history data may correspond to one or more actions (as determined by the action selector 324) performed in response to the user inputs for the current dialog session. The action history data may include an identifier for the API 310 called to perform the action, the data inputted to the API 310, and the data outputted by the API 310. The dialog state data may be stored for each turn of the dialog session and may be identified by a turn number, so that the order in which the user inputs are received and the system responses are generated is known. The dialog state data may also include a skill identifier for the skill component 190 that may be invoked to generate the system response.

The dialog focus component 316 may store graph-based dialog state data including a plurality of graph nodes; each graph node may correspond to an item of state data, such as an entity type, entity value, prior API call, and/or user data. The other components, such as the inference engine 322, may access all of the graph nodes or may access only a subset of the graph nodes. The dialog focus component 316 may use any type of storage mechanism and may serve as long-term and/or short term memory for the dialog management component 160, thus enabling tracking of entities, ASR output data, TTS output data, and other features at each turn of a dialog. In some embodiments, the dialog focus component 316 may be updated after each turn of dialog with updated dialog state data.

The dialog focus component 316 may store data relevant to a dialog session. In various embodiments, the dialog focus component 316 stores the input data 302, other input data 304, entity data from the NER component 318, action data, and/or response data. The dialog focus component 316 may further store additional information, such as device/user location data, user preference data, and environment data. In various embodiments, the dialog focus component 316 uses an encoder to encode some or all of the received data into one or more feature vectors and a decoder to determine, based on the feature vectors, goal data corresponding to a dialog goal of a user.

The controller component 320 may send data from the dialog focus component 316, the entity data from the NER component 318, the input data 302, and/or the other input data 304 to the inference engine 322 for processing. The inference engine 322, in some embodiments, may include an action selector component 324, which is configured to predict an action responsive to a user input, and an argument filling component 326, which is configured to determine data usable to perform the predicted action. In other embodiments, the inference engine 322 may include a single component for predicting the action and for determining the data needed to perform the predicted action.

In some embodiments, the inference engine 322 may employ one or more machine learning models configured to process data from the dialog focus component 316, the entity data from the NER component 318, the input data 302, and/or the other input data 304, along with the dialog models 314 stored at the dialog model storage 330 to predict an action.

The action selector component 324 processes the current dialog context and predicts the next action type and action name to run. The three action types, that action selector component 324 may predict from in some embodiments, are as follows: (1) API-which causes invocation of an API associated with the skill component; (2) Response-which causes output of a natural language response to the user (for example, inform of a transaction result or request more information), and (3) System-which causes the dialog management component 160 to wait for the next user input. This action type is an internal/system action to indicate all tasks have run.

The action name can be an API definition name or a response name. The inference engine 322 may run the action selector component 324 multiple times in a single turn until it predicts the System action type.

For example, a skill component may be configured to book movie tickets and may be associated with an API name "FindShowtimes", which has an argument, <title>, of type <MovieTitle>. The user 105 may say "Find showtimes for the [movie]." In this example, the action selector component 324 may run three times with respect to the user input. The first run may predict the API action type with name "FindShowtimes" and may invoke the API. The second run may predict the Response action type with name "InformMovieShowtimes" and may render the corresponding response. The third run may predict the System action type, which terminates action prediction processing by the action selector component 324.

In some embodiments, the action selector component 324 may process (at least) the input data 302 and the data from the dialog focus component 316 using one or more dialog models 314 stored at a dialog model storage 330. The action selector component 324 may select one or more dialog models 314, from the dialog model storage 330, for further processing of the input data 302. Each dialog model 314 may be associated with one or more categories of functions. Each dialog model 314 may correspond to a sample dialog flow including sample user inputs and sample system responses to the user inputs. The sample system responses may be natural language outputs, API calls, or both.

The action selector component 324 may be a trained model, such as a classifier. In some embodiments, the action selector component 324 generates an N-best list of dialog models including two or more of the dialog models 314 for further processing. The action selector component 324 may create the N-best list by determining a score for each dialog model 314 given the data stored at the dialog focus component 316 and the input data 302. The dialog model 314 may include a corresponding goal type (e.g., play music, reserve a taxi, book a flight, etc.), one or more corresponding APIs, one or more corresponding system responses, and/or one or more entities corresponding to the goal type. The action selector component 324 may, for example, determine a score, for a dialog model 314, based on a presence or absence of one or more entities determined by the NER component 318 in the dialog model 314. Presence of an entity in a list of entities corresponding to a dialog model 314 may, for example, result in a higher score for the dialog model 314. The action selector component 324 may send the input data 302 to the dialog models 314 having the N-highest scores. In other embodiments, the action selector component 324 sends the input data 302 to the dialog models 314 having scores greater than a threshold. The threshold may be a numerical value or the number N of dialog models 314 to be selected.

In some embodiments, the action selector component 324 may select the dialog model 314 with the highest score for further processing. The action selector component 324 may process the input data 302 and the data from the dialog focus component 316 using the selected dialog model 314. Such processing may result in determining an action to be performed in response to the user input corresponding to the input data 302. The action may be calling one or more APIs 310. For example, an API 310 configured to reserve a taxi may be called. The action may be outputting a natural language output, for example, to confirm performance of the action, to solicit additional data needed to perform the action, etc.

The argument filling component 326 may be configured to determine one or more types of data needed to perform the action determined by the action selector component 324. For example, the argument filling component 326 may determine which arguments are needed to call an API 310 (e.g., pick-up location, drop-off location, pick-up time, etc.), corresponding to the determined action. The argument filling component 326 may also determine whether the types of data needed are available at/known to the dialog management component 160. To make this determination, the argument filling component 326 may use the entity data generated by the NER component 318 and the data from the dialog focus component 316. For example, the user 105 may have mentioned one or more of the pick-up location, the drop-off location or the time in the instant user input (corresponding to the input data 302) or in the previous user inputs of the dialog session.

The argument filling component 326 fills action arguments with entities from the dialog context. An entity may be a slot the user mentioned in a user input or may be return values from previous invoked APIs in the dialog session.

When the action selector component 324 predicts an API action or a Response action, the next step is to determine how to fill the arguments with entities. The argument filling component 326 may use dialog context, stored at the dialog focus component 316, to access all available entities for the dialog session. The argument filling component 326 supports contextual carryover as it considers entities mentioned by the user 105 and entities outputted by APIs across the entire dialog session. The argument filling component 326 then selects the most likely entities to fill arguments (of the same type as the entities), which the inference engine 322 then uses when invoking actions.

For example, a skill component may be associated with an API definition "FindShowtimes", which has an argument, <title>, of type <MovieTitle>, and returns entity type <ShowTimeInfo>, which has properties <time> (entity type <Time>) and <theaterName> (entity type <TheaterName>). The user 105 may say "Find showtimes for the [movie]".

The NER component 318, in this example, may output entity data: {<MovieTitle>: "[movie]"}. The entity data may be stored in the dialog focus component 316. After the action selector component 324 predicts the API action with name "FindShowTimes", the argument filling component 326 may use {<MovieTitle>: "[movie]"} to fill the <title> argument of the "FindShowTimes" API, and the inference engine 322 then invokes the API. On the next run, the action selector component 324 may predict the Response action type with name "InformMovieShowtimes" associated with a <time> argument and a <theaterName> argument, and the argument filling component 326 may fill the arguments using the <time> entity and the <theaterName> entity returned by the "FindShowTimes" API.

In some embodiments, the argument filling component 326 may determine that one or more types of data needed to call an API 310 are not available/known to the dialog management component 160. In such cases, the inference engine 322 may determine to generate a natural language output requesting the missing data from the user 105.

In some embodiments, the argument filling component 326 may determine a confidence score for the data corresponding to a type of data needed to call an API 310. If the confidence score for the data is below a threshold value (i.e. the argument filling component 326 is not confident that the data corresponds to the type of data), then the inference engine 322 may generate a natural language output confirming use of the data to perform the action. For example, the system may output synthesized speech "Do you want a taxi to pick you up from [location]," where [location] may be derived from the entity data corresponding to the input data 302 or from the data stored at the dialog focus component 316.

If the argument filling component 326 determines that two pieces of data may correspond to the type of data (e.g., based on similar or same confidence scores), then the inference engine 322 may generate a natural language output requesting the user 105 to select one of the two pieces of data. For example, the system may output synthesized speech "Do you want a taxi to pick you up from [first location] or [second location]," where [first location] may be derived from the entity data corresponding to the input data 302 and [second location] may be derived from the data stored at the dialog focus component 316.

In generating a natural language output, the inference engine 322 may send natural language output data to the controller 320. The natural language output data may be text data, structured data, or other natural language representations. The natural language output data may be provided to the NLG component 340, by the controller 320, for processing.

In some embodiments, the inference engine 322 may perform entity resolution after argument filling is complete by the argument filling component 326. An entity resolution component 328, of the inference engine 322, may be configured to perform entity resolution.

In some embodiments, the entity resolution component 328 may perform entity resolution processing to identify the specific entities included in the input data 302. For example, entity resolution processing may result in associating a word in the input data 302 to a particular person, place, thing, idea, and/or goal; example entities include proper names, nicknames, business names, place names, song titles, and skill names.

In some embodiments, the entity resolution component 328 may perform entity resolution processing if the action selector component 324 predicts the API action type. For each entity to fill an API argument, the entity resolution component 328 may search against stored entities and may resolve phrases into canonical values if there is a match. The inference engine 322 may insert the result of the entity resolution processing as a separate payload in the API-invoking request.

In some embodiments, the entity resolution component 328 may not perform entity resolution processing if the action selector component 324 predicts the Response action type. In such embodiments, there may not be a need for resolving a named entity to a specific entity for the Response action type, where the system is outputting a natural language output to inform the user 105 of performance of an action, request the user 105 to provide more information, etc. In invoking an API, there may be a need for a specific entity (thus a need for entity resolution processing) so that the API can execute with respect to the specific entity. In other embodiments, the entity resolution component 328 may perform entity resolution processing for Response action types.

The entity resolution component 328 may apply rules or other instructions to transform labels or tokens into a standard representation. The transformation may depend on the skill. For example, for a travel skill, the entity resolution component 328 may transform text data corresponding to "Boston airport" to the standard BOS three-letter code referring to the airport. The entity resolution component 328 can refer to an entity storage(s) (including data representing entities known to the system 120) to resolve the precise entity referred to in the input data 302. Specific entity combinations may also be tied to a particular source, which may then be used to resolve the entities in the input data 302. In the example "play songs by the [artist]," the entity resolution component 328 may reference a personal music catalog, user profile data, or the like. The entity resolution component 328 may output data including entity IDs corresponding to specific entities mentioned in the user input. The entity resolution component 328 may include multiple entity resolution components and each entity resolution component may be associated with one or more particular skills.

The entity resolution component 328 may use frameworks, linked to skills, to determine what database fields should be searched to determine the meaning of tagged entities, such as searching a user's gazetteer for similarity with the framework entities. For example, a framework for a music skill may indicate to attempt to resolve an identified object based on {Artist Name}, {Album Name}, and {Song name}, and another framework for the same skill might indicate to attempt to resolve an object modifier based on {Artist Name}, and resolve the object based on {Album Name} and {Song Name} linked to the identified {Artist Name}. If the search of the gazetteer does not resolve an entity using gazetteer information, the entity resolution component 328 may search a database of generic words. For example, if the input data 302 includes "play songs by the [artist]," after failing to determine an album name or song name called "songs" by "the [artist]," the entity resolution component 328 may search a vocabulary for the word "songs." In the alternative, generic words may be checked before the gazetteer information, or both may be tried, potentially producing two different entity data results.

The inference engine 322 may process the input data 302 using the selected dialog model(s) 314. In some embodiments, the dialog model(s) 314 may also process dialog context data from the dialog focus component 316. Each dialog model 314 may be a trained model, such as a sequence-to-sequence model, an encoder-decoder model, a neural network, etc., and may be trained using goal-oriented dialog training data. The training data may include dialog data between a user and a system and may include API call information related to goals expressed by the user.

Each of the selected dialog models 314 may generate response data based on the input data 302. The response data may include output text data, which may correspond to a prompt for more information (e.g., additional entity information). The response data may further include API call data and corresponding entities (arguments for the API call).

The action selector component 324 is configured to select at least one of the outputs of the dialog model(s) 314 for further processing. Each output may be associated with a corresponding category of function(s). The action selector component 324 may be a trained model, such as a classifier, and may determine a score for each of the outputs of the dialog models 314 based on each's similarity or relevance to the dialog context data from the dialog focus component 316, based on user preference data (from the profile storage 170), and/or based on the input data 302. The output of the dialog model 314 corresponding to the highest score is selected; if the output is an API call, one or more APIs 310 may be activated and a corresponding action carried out. If, however, the output is a prompt or other output data, the natural language generation (NLG) component 340 may be used to generate the output data 306 (which may be text data or other natural language representation data) and/or other output data 308 based on the output of the dialog model 314. In either case, the selected action may be used to update the dialog context data at the dialog focus component 316.

In some embodiments, the inference engine 322 may invoke the API 310 directly to perform an action. In other embodiments, the inference engine 322 may send a request to the controller 320 to invoke the API 310. In some embodiments, the inference engine 322 may send (via the controller 320 in some embodiments) a command to the skill component 190 to invoke the API 310, where the command may include entity data corresponding to the arguments of the API 310.

In some embodiments, the inference engine 322 may directly send data corresponding to the Response action type to the NLG component 340. In other embodiments, the inference engine 322 may send data corresponding to the Response action type to the controller 320 to send to the NLG component 340.

In some embodiments, the inference engine 322 may send, to the dialog focus component 316, a request for additional context data. This request may be based at least in part on the data needed to execute one or more of the dialog models 314. Alternatively or additionally, this request may be to obtain data to help in selecting one of the dialog models 314 from the dialog model storage 330.

In some cases, if there are any unresolved entities, the inference engine 322 (or the entity resolution component 328) may send to the skill component 190, unresolved entity data. The skill component 190 may process the unresolved entity data and, using the techniques described herein with respect to entity resolution processing, may return resolved entity data to the inference engine 322. The skill component 190 may be, for example, a communication skill, and may include a database of contact information for a user account and may resolve an ambiguous name in the unresolved entity data by, for example, resolving names in the contact information. The inference engine 322 (in some embodiments via the controller 320) may send resolved entity data to the dialog focus component 316 for updating the dialog state data for the current dialog session.

The inference engine 322 (via the controller 320 in some embodiments) may send response action data to the NLG component 340, where the response action data may be used by the NLG component 340 to generate text or other data representing a natural language output. For example, the response action data may include one or more nouns, one or more verbs, one or more objects, one or more subjects, and/or other parts of a sentence that the NLG component 340 can use to generate one or more natural language sentences.

The NLG component 340 may be a trained model, such as a neural network, and may generate output data 306 using the response action data from the inference engine 322. The output data 306 may have a natural feel and, in some embodiments, includes words and/or phrases specifically formatted for the user 105. As opposed to using templates to formulate responses, the NLG component 340 may include ML models trained from the various templates for forming the output data 306. For example, the NLG component 340 may analyze transcripts of local news programs, television shows, sporting events, or any other media program to obtain common components of a relevant language and/or region. As one illustrative example, the NLG component 340 may analyze a transcription of a regional sports program to determine commonly used words and/or phrases for describing scores and/or other sporting news for a particular region. The NLG component 340 may further receive, as input, data from the dialog focus component 316, such as the dialog history and the input data 304. The NLG component 340 may also receive other data that can be used to determine a structure for the output data 306, such as a level of formality in the dialog session (e.g., formal, informal, casual, etc.).

In some embodiments, the NLG component 340 may generate output data 306 based on one or more response templates. For example, the NLG component 340 may select a template in response to the question, "What is the weather currently like?" of the form: "The weather currently is $weather_information$." The NLG component 340 may analyze the logical form of the template to produce one or more natural language responses including markups and annotations to familiarize the response that is generated. In some embodiments, the NLG component 340 may determine which response is the most appropriate response to be selected. The selection may be based on past system responses of the present dialog session, past user inputs of the present dialog session, a level of formality of the present dialog session, and/or other data. Synthesized speech may be generated by processing the output data 306 using the TTS component 180.

The skill component 190, in this case, may be the skill component that is in focus for the current dialog session. In some embodiments, the content interaction skill component 192 may be in focus for the current dialog session. A skill component may be in focus for a dialog session based on the skill component being invoked to respond to a first or prior user input of the dialog session, based on the user 105 invoking the skill component specifically (e.g., by including the skill name in the user input), and/or based on the dialog management component 160 (or another component of the system 120) determining which skill component corresponds to the goal of the dialog session.

Based on the content interaction skill component 192 being in focus, the dialog management component 160 may use dialog models 314 corresponding to website interactions for the corresponding domain. For example, in the case the user input corresponds to the hair salon/service domain, the inference engine 322 may use dialog models 314 corresponding to the hair salon/service domain. As another example, in the case the user input corresponds to the car parking domain, the inference engine 322 may use dialog models 314 corresponding to the car parking domain.

Figure 4:
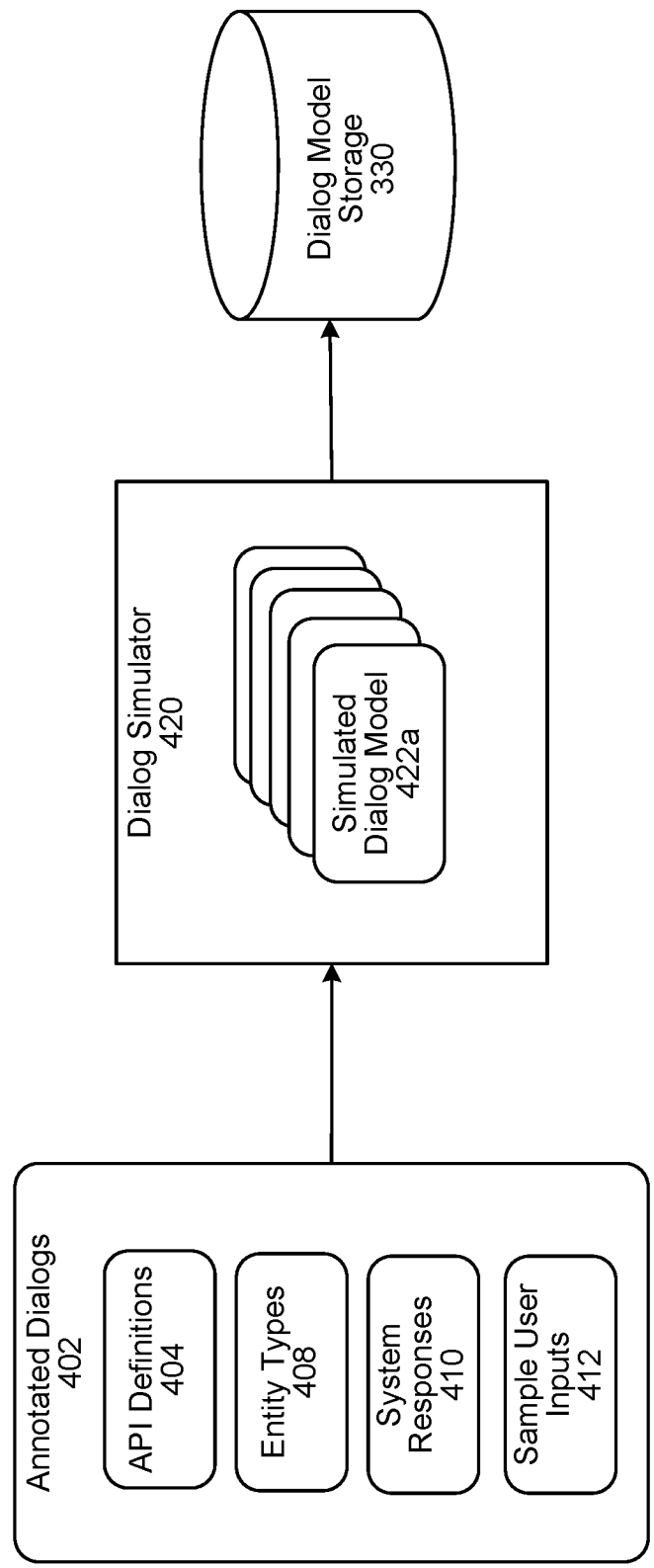
FIG. 4 is a conceptual diagram illustrating a dialog simulator component to generate dialog models for use by the dialog management component, according to embodiments of the present disclosure.

FIG. 4 is a conceptual diagram illustrating a dialog simulator component 420 to generate dialog models 314 for use by the dialog management component 160. The dialog simulator component 420 may receive one or more annotated dialogs 402. Each of the annotated dialogs 402 may be associated with one or more of: API definitions 404, entity types 408, system responses 410, and sample user inputs 412. The annotated dialog 402 may, for example, indicate an API definition 404 that is to be invoked when a user provides a sample user input 412. As another example, the annotated dialog 402 may indicate a system response 410 to be outputted when a user provides a sample user input 412. As yet another example, the annotated dialog 402 may indicate an API definition 404 that is to be invoked when a user provides a sample user input 412, and a system response 410 that is to be outputted after the API has completed its function. As yet another example, the annotated dialog 402 may indicate an API definition 404 to be invoked and/or a system response 410 to be outputted when an entity type 408 is stored/available in the dialog context data.

A dialog model 314 may be generated by the dialog simulator component 420 by generalizing the annotated dialogs 402, which may be provided by a skill developer or another system, to cover various ways a user may interact with a skill. For example, a user may say variations of utterances to invoke the same functionality, provide requested information out of order, or change previously provided information. The dialog simulator component 420 may generate data, for the dialog model 314, by expanding the annotated dialogs-including entity types, API definitions, sample user inputs, and sample system responses-into tens of thousands of dialog variants, phrasing variations, and uncommon alternatives to create a wider range of possible dialog paths. These expanded annotated dialogs may be stored in the dialog model storage 330, and may be used by the dialog management component 160 as described above. A dialog model 314 may include data representing a flow of a dialog based on sample user inputs, entity types, API calls, system responses, etc.

Figure 5:
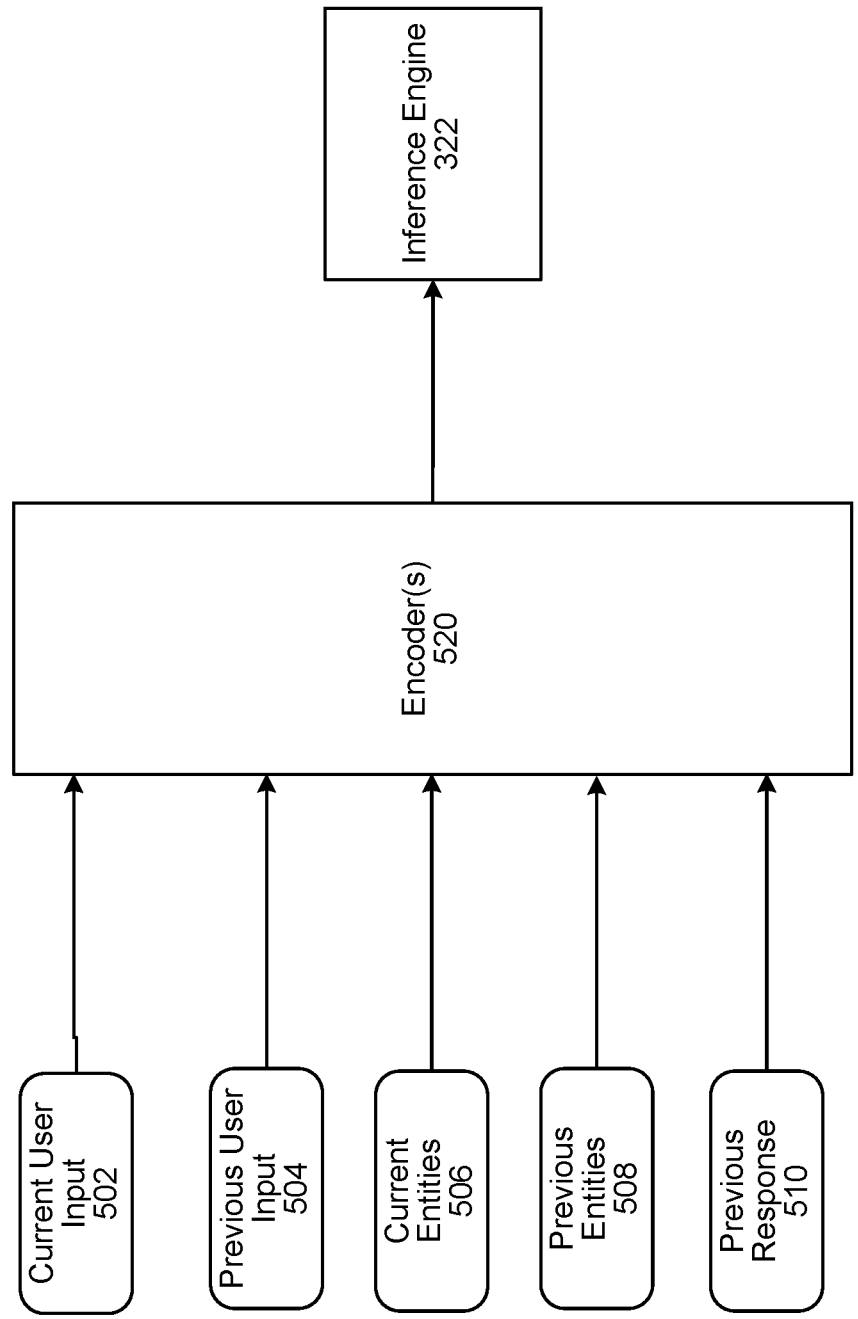
FIG. 5 is a conceptual diagram illustrating data that may be processed by an inference engine of the dialog management component, according to embodiments of the present disclosure.

FIG. 5 conceptually illustrates the types of data that may be processed by the inference engine 322. In some embodiments, all types of data may be inputted into a single encoder 520. In other embodiments, each type of data may be inputted into a separate different encoder 520. The output of the encoder(s) 520 (e.g., encoded data) may be inputted to the inference engine 322 for processing.

In example embodiments, the encoder(s) 520 may take as input a word sequence of L length, and project the word sequence to an F-dimensional vector, where/may be a configurable length. The encoder(s) 520 may output vectors of the same length regardless of the length of input word sequence. The output vector of the encoder(s) 520 may also be referred to as an embedding or a word embedding. The encoder(s) 520 may be a recurrent neural network, LSTM, or other type of ML model.

One type of data that the inference engine 322 may process is current user input data 502, which may correspond to a user input of the current turn of the dialog session. Another type of data that the inference engine 322 may process is previous user input data 504, which may correspond to one or more user inputs of previous turns of the dialog session (i.e. turns that took place before the current turn of the dialog session). The current user input data 502 and the previous user input data 504 may be text data, token data, or ASR data corresponding to the user input. The previous user input data 504 may be a matrix, where each row (or column) may correspond to a different previous turn of the dialog session.

The inference engine 322 may also process current entities data 506, which may correspond to one or more entities included in the user input of the current turn. The inference engine 322 may also process previous entities data 508, which may correspond to one or more entities included in the user inputs of the previous turns. The current entities data 506 and the previous entities data 508 may also include an entity type corresponding to each of the entities. The previous entities data 508 may also include a turn identifier to identify which turn of the dialog session the entities correspond to.

Another type of data that the inference engine 322 may process is previous response data 510, which may correspond to one or more system responses in the previous turns of the dialog session. The previous response data 510 may be text data corresponding to a natural language output presented by the system in response to a user input. The previous response data 510 may additionally or alternatively be data representing an API call, inputs used for the API call, and/or the output of the API call. The previous response data 510 may be a matrix where each row (or column) may correspond to a different previous turn of the dialog session.

The system 120 may use other components illustrated in FIG. 1, which are further described herein. The various components shown in FIG. 1 may be located on a same or different physical devices. Communication between various components may occur directly or across the network(s) 199.

Figure 6:
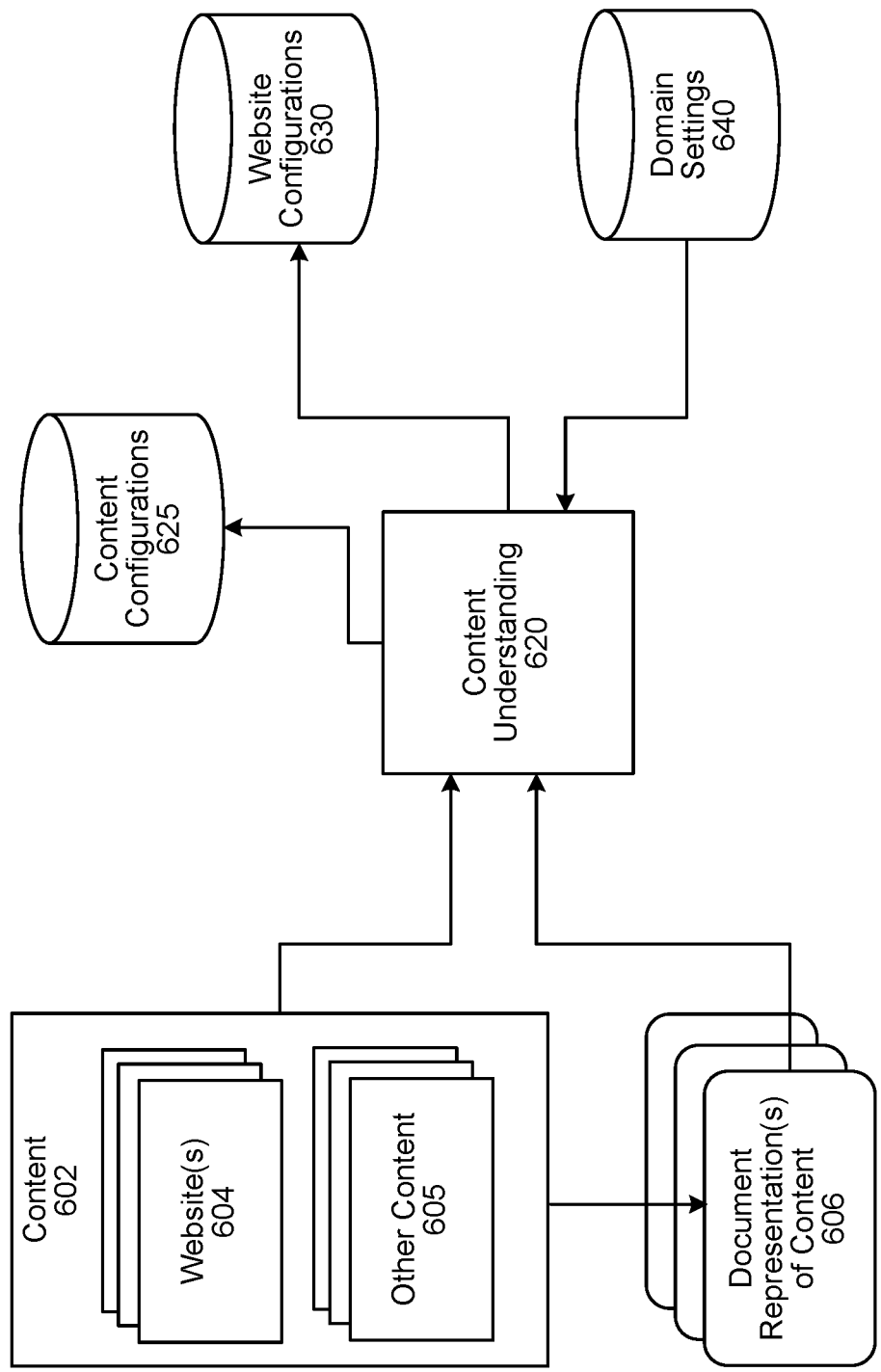
FIG. 6 is a conceptual diagram illustrating example processing of content performed during build time, according to embodiments of the present disclosure.

FIG. 6 is a conceptual diagram illustrating example processing of content 602, including websites 604 and other types of content 605, performed during build time. During build time, the system may process multiple different pieces of content 602 to extract information regarding the content, tasks and actions that can be performed using the content, how a user can interact with the content, etc. For example, the system may process multiple different websites 604 to extract information regarding the websites, tasks and actions that can be performed using the websites, how a user can interact with the websites, etc. The components shown in FIG. 6 may be included in the system 120 or in another system (including components shown in FIG. 16). Alternatively, some of the components of a content understanding component 620 may be included in the system 120, while other components may be included in another system. The content 602 may be hosted at a separate system/server than the system that is used to perform the build time processing described herein. The build time processing that may be performed with respect to the websites 604, as an example, is described below in relation to FIGS. 7-13.

The other types of content 605 may be interactive visual content presented via an application. For example, the other content 605 may be emails, calendar invites, meeting requests, books, tickets, travel itineraries, magazines, etc. The content 605 may be presented via an email application, a project collaboration application, an electronic book application, a travel application, etc.

During the build time processing, the system may use the content understanding component 620 to process the content 602. The content understanding component 620 may be configured to understand content structure, webpage structure, entities included in the content, content navigation for a task, etc. In some embodiments, the content understanding component 620 may also or instead process a document representation(s) of the content 606. A document representation of the content 606 may be a document (e.g., data or file including text, images, graphics, videos, etc. represented in the content 602) that may be used to understand the content 602. For example, a document representation of a website 606 may be a document including HTML and CSS code of the website, a document including text and images of the websites, or another type of representation of the website that can be used to understand the content of the website.

Based on build time processing, the content understanding component 620 may store data in a content configurations storage 625 and a website configurations storage 630. The content understanding component 620 may use, in some embodiments, data stored in a domain settings storage 640. The domain settings storage 640 may store data representing actions (or intents) relating to a domain, entities relating to the domain, and other information (e.g., sample user inputs, sample system responses) that may be used to process user inputs relating to the domain. In some embodiments, the entities may be associated with a particular action. In a non-limiting example, for a hair salon domain, the domain settings storage 640 may store action data representing actions such as BookAppointment, ChangeAppointment, CancelAppointment, FindWaitTime, FindLocation, FindService, FindStylist, etc., and entity data representing entities such as AppointmentDateTime, Service, Stylist, etc. The entities may represent information needed to perform the actions. The system 120 may request the information from the user 105, may determine the information from other data (e.g., profile data) available at the device 110/the system 120, or may determine the information from user inputs already provided (e.g., in previous dialog turns) by the user 105. The domain settings data storage 640 may represent data corresponding to actions derived from natural language user inputs, whereas the website configuration data 630 may represent a mapping between the natural language derived actions and web actions to be performed to achieve the actions. In some cases, the actions derived from the natural language user inputs may be referred to as user actions or semantic actions. In some cases, the actions determined by the dialog management component 160/action selector 324 may be referred to herein as a dialog action, a user action or a semantic action, and may be similar to the actions stored in the domain settings data storage 640.

During build time processing, the content understanding component 620 may generate different configurations for different tasks for given piece of content. For example, a user may be able to perform more than one task using one website 604. The content understanding component 620 may generate and store first configuration data, in the website configurations storage 630, for a first task, store second configuration data, in the website configurations storage 630, for a second task, etc., where the first and second configuration data may be determined based on processing the same website 604. In some embodiments, the website configuration data may be associated with an identifier (e.g., a website name, a website URL, a numerical identifier associated with a website, etc.) corresponding to the website 604. The configuration data may also be associated with a task identifier (e.g., a task name, such as "hair cut appointment" or "hair color appointment", a numerical identifier associated with a task, etc.).

As another example, the content understanding component 620 may generate and store first configuration data, in the content configurations storage 625, for a first task, may generate and store second configuration data, in the content configurations storage 625, for a second task, etc., where the first and second tasks can be performed using the same piece of content 605. In some embodiments, the content configuration data may be associated with an identifier (e.g., a content identifier, a content name, a URL and/or storage location to access the content, etc.) corresponding to the content 605. The content configuration data may also be associated with a content type (e.g., book, email, meeting request, etc.) in the content configurations storage 625.

At build time, using information available in the domain settings storage 640 (e.g., actions relating to the domain, entities relating to the domain, etc.) and information on the given websites 604, the content understanding component 620 explores and understands the website to create configuration data specific to the website. The configuration data may represent where particular information can be retrieved from the website (e.g., which web page, which field, etc.), where particular information can be entered (e.g., submission form, radio button selections, etc.), and the website navigation sequence (e.g., first click on the button, then enter the information, then select between presented options) to perform a task/complete a goal.

Figure 7:
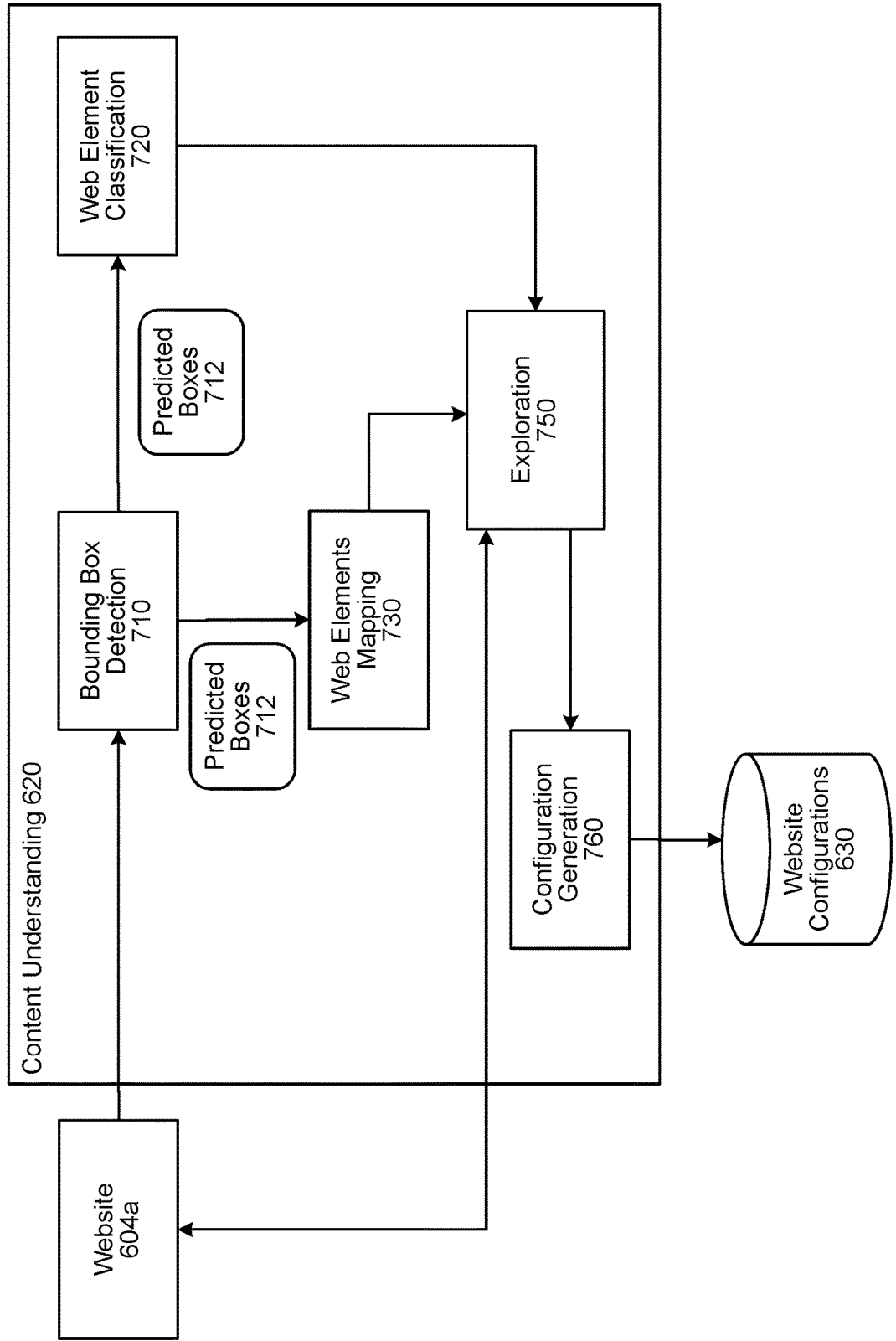
FIG. 7 is a conceptual diagram illustrating components of a content understanding component for processing websites, according to embodiments of the present disclosure.

FIG. 7 illustrates example components of the content understanding component 620. As shown, in some embodiments, the content understanding component 620 may include a bounding box detection component 710, a web element classification component 720, a web elements mapping component 730, an exploration component 750, and a configuration generation component 760. The bounding box detection component 710, the web element classification component 720 and the web elements mapping component 730 may be configured to find bounding boxes within the webpage and align the bounding boxes to website actions (e.g., click, select, enter, etc.) and entities corresponding to the domain and stored in the domain settings storage 640.

A bounding box is a visual area of a web page defined by, for example, a rectangle. The bounding box may include one or more visual elements displayed at a web page, for example, a button, text, an image, etc. In some embodiments, the bounding box may include the smallest number of related elements. For example, a first bounding box may include a title and text following the title, a second bounding box may include a button, a third bounding box may include an image and text following the image/describing the image. In other embodiments, the bounding box may only include one visual element of the web page. The bounding box may be represented as a set of pixels (x, y coordinates) corresponding to, for example, the corners of the rectangle. In other embodiments, the bounding box may be represented as two longitudes and two latitudes, where the longitude is a decimal number between-180.0 and 180.0 and the latitude is a decimal number between-90.0 and 90.0.

Figure 8:
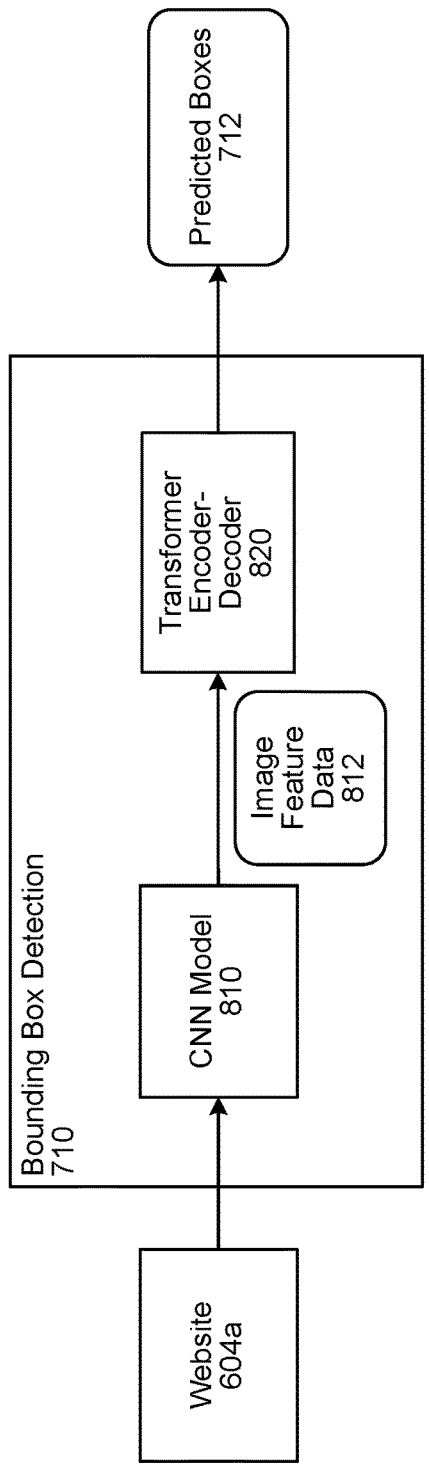
FIG. 8 is a conceptual diagram illustrating an example embodiment of a bounding box detection component, according to embodiments of the present disclosure.

The bounding box detection component 710 may process an individual (first) website 604*a* to determine predicted boxes data 712. The predicted boxes data 712 may correspond to multiple different bounding boxes identified from the website 604*a*. The predicted boxes data 712 may be a set of pixels for each bounding box or set of longitudes and latitudes for each bounding box, or some combination thereof. FIG. 8 illustrates an example embodiment of the bounding box detection component 710. In this example embodiment, the bounding box detection component 710 may be configured to process an image representation of the website 604*a*. For example, each web page of the website 604*a* may be represented as an image (.jpg, .png, etc.). The bounding box detection component 710 may process the image representation of the website 604*a* using a convolutional neural network (CNN) model 810 to generate image feature data 812. Other embodiments may use one or more different types of machine learning model than the CNN model 810 to generate the image feature data 812. The bounding box detection component 710 may process the image feature data 812 using a transformer encoder-decoder component 820, which may be configured to take as input the image feature data 812 and determine which portion of the image represents a visual element that belongs to a bounding box. For example, the transformer encoder-decoder component 820 may identify a portion (pixels) of the image feature data 812 representing a button, and may determine that the identified portion is part of one bounding box. In some embodiments, the transformer encoder-decoder component 820 may output the pixels/portion of the image feature data 812 corresponding to a bounding box. In other embodiments, the transformer encoder-decoder component 820 may output the image representation of the website 604*a* including the identified bounding box(es) (e.g., as one or more colored unfilled rectangles). The transformer encoder-decoder component 820 may be trained to identify portions of an image that represent a visual element of a website. In some embodiments, the transformer encoder-decoder component 820 may be trained using annotated webpages, where the annotations indicate the bounding boxes for the visual elements included in the corresponding webpage. The bounding box detection component 710 may perform further processing on the output of the transformer encoder-decoder component 820 to generate the predicted boxes data 712.

Figure 9:
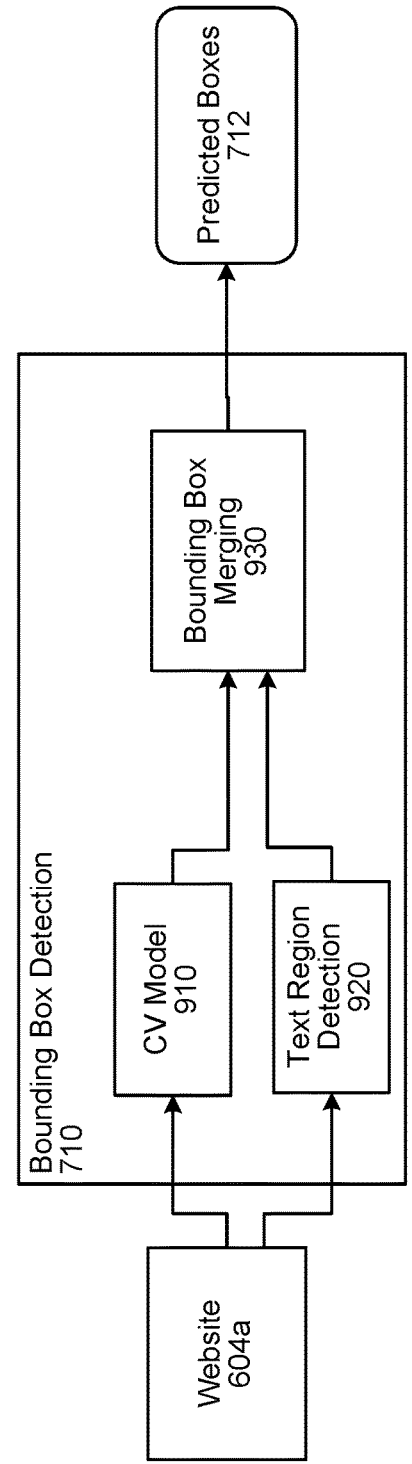
FIG. 9 is a conceptual diagram illustrating another example embodiment of a bounding box detection component, according to embodiments of the present disclosure.

FIG. 9 illustrates another example embodiment of the bounding box detection component 710. In this embodiment, the bounding box detection component 710 may process the website 604*a* using a combination of a computer vision (CV) model 910 and a text region detection component 920. The CV model 920 may employ one or more machine learning models configured to perform computer vision techniques, such as, but not limited to, image processing. The CV model 920 may be configured as an unsupervised bounding box detection model, and may process an image representation of the website 604*a* to identify portions of the website 604*a* belonging to bounding boxes. The text region detection component 920 may employ one or more machine learning models configured to perform, for example, image processing, and may be configured to identify portions of the website 604*a* that represent text. Such text may be text of a button, text corresponding to an input field, a block of text, etc. A bounding box merging component 930 may process the outputs of the CV model 910 and the text region detection component 920, and may determine the predicted boxes data 712 representing the bounding boxes identified for the website 604*a*. The bounding box merging component 930 may combine or merge the portions of the website 604*a* identified by the CV model 910 and the portions of the website 604*a* identified by the text region detection component 920. Such combining or merging may be based on an overlap in the portions (pixels). For example, the CV model 910 may identify a first portion of the website 604*a* for a first bounding box, where the first portion may be a button labeled "Search," and the text region detection component 920 may identify the same first portion as including text. Based on these two portions being the same, the bounding box merging component 930 may determine that the identified first portion of the website 604*a* may belong to a bounding box. As another example, the CV model 910 may identify a second portion of the website 604*a* for a second bounding box, where the second portion may be a button labeled "Find Locations," and the text region detection component 920 may identify a third portion "Find" and a separate fourth portion "Location" as representing text regions. The bounding box merging component 930 may combine the third and fourth portions with the second portion based on the overlap in pixels, and may determine that the second portion belongs to a bounding box.

The bounding box detection component 710 may employ different techniques than described herein. The bounding box detection component 710 may be particularly configured to identify bounding boxes for websites. That is, one or more components of the bounding box detection component 710 may be trained using training data that includes multiple websites. One or more components of the bounding box detection component 710 may be trained using annotated websites (e.g., supervised learning). Alternatively, one or more components of the bounding box detection component 710 may trained using unlabeled websites (e.g., unsupervised learning).

In some embodiments, the bounding box detection component 710 may filter out bounding boxes that are too small (e.g., have an area smaller than a first threshold value), and/or bounding boxes that are too large (e.g., have an area larger than a second threshold value) before determining the predicted boxes data 712.

Figure 10:
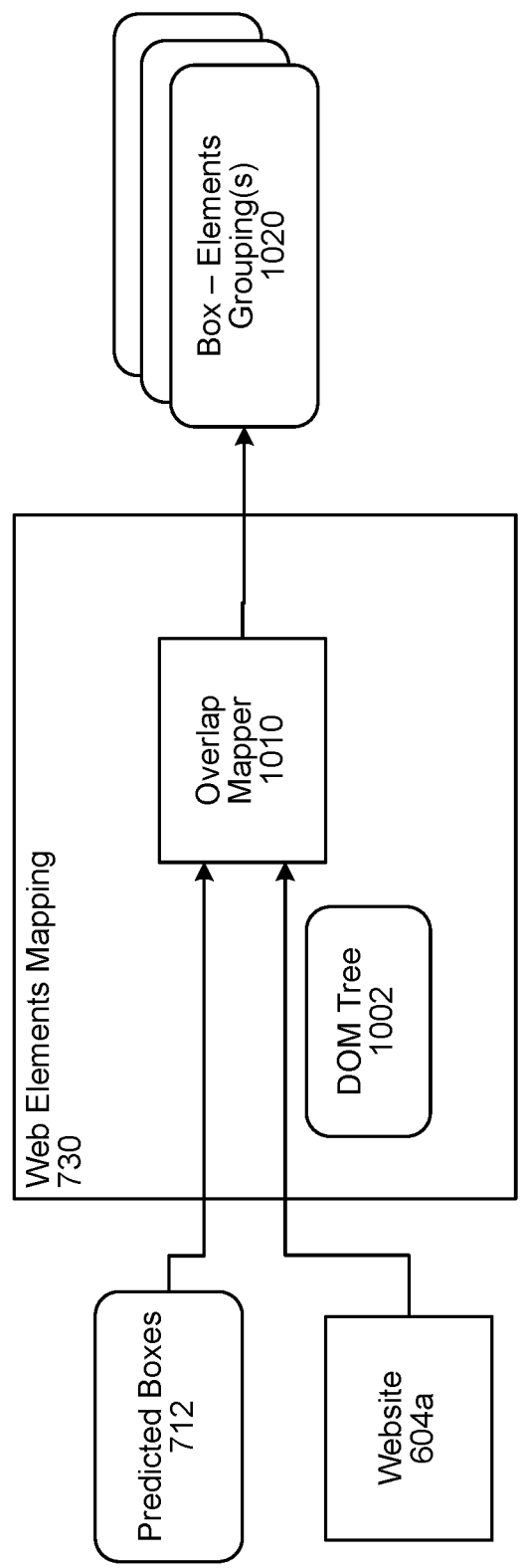
FIG. 10 is a conceptual diagram illustrating a web elements mapping component, according to embodiments of the present disclosure.

FIG. 10 illustrates the web elements mapping component 730. The web elements mapping component 730 may be configured to align the identified bounding boxes, represented in the predicted boxes data 712, to web elements represented in a Document Object Model (DOM) tree 1002 for the website 604*a*. The DOM is a programming interface for web documents, and represents a web page so that programs can change the document structure, style, and content. The DOM represents the web document as a logical tree including nodes and objects. A node of the DOM tree may reference one or more HTML elements of the website 604*a*. For example, if the website 604*a* includes a button labeled "Search", a node in the DOM tree 1002 may include an HTML element corresponding to a button, and may also include data representing a name of the button: "Search." The node may also include style information (e.g., font size, font type, button graphic, etc.) for how the button is presented in the website 604*a*. As a further example, a node, connected to the "Search" button node, may represent one or more HTML elements that are presented when a user clicks on the "Search" button. The information in the DOM tree can be accessed using known DOM methods, APIs, etc.

The web elements mapping component 730 may use one or more known methods to access the DOM tree 1002 of the website 604*a*. The web elements mapping component 730 may, using an overlap mapper component 1010, process (e.g., traverse) the DOM tree 1002 for the website 604*a* with respect to the predicted boxes data 712, and identify one or more nodes of the DOM tree 1002 that correspond to an identified bounding box. In some embodiments, the overlap mapper component 1010 may align the nodes of the DOM tree 1002 to an identified bounding box such that the overlap between the bounding box and the nodes in the DOM tree is maximized. The overlap may be determined in terms of visual overlap (e.g., based on the pixels corresponding to the bounding box, and pixels corresponding to the DOM tree node). For example, the overlap mapper component 1010 may determine a ratio between the number of nodes in the DOM tree 1002 and the number of nodes corresponding to the bounding box, and try to maximize this ratio. The overlap mapper component 1010 may determine a top-k list of HTML elements from the DOM tree 1002 as corresponding to a bounding box, where the value of k may be configurable. The output of the overlap mapper component 1010 may include one or more box-elements groupings 1020. A box-elements grouping 1020 may include a representation (e.g., pixel data, longitudes and latitudes, etc.) of an identified bounding box from the predicted boxes data 712 and a reference to the HTML elements corresponding to that bounding box. The groupings 1020 may include a grouping for each bounding box included in the predicted boxes data 712.

Figure 11:
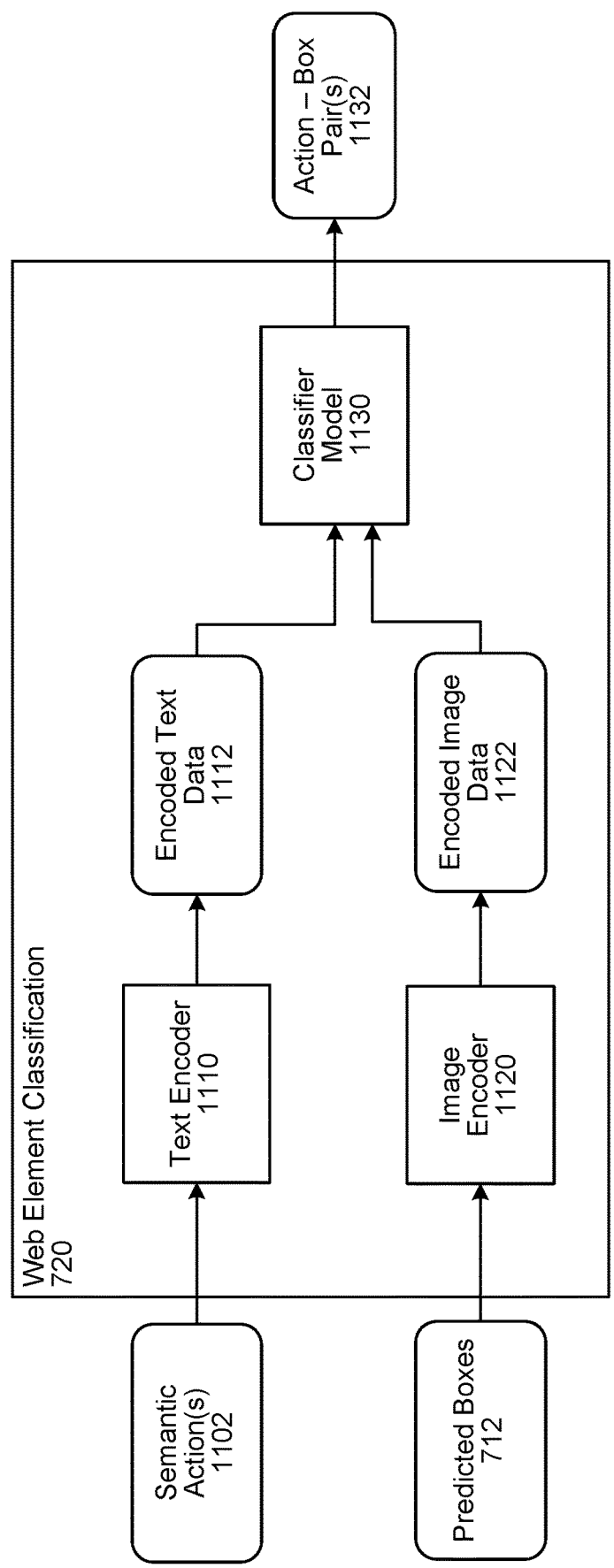
FIG. 11 is a conceptual diagram illustrating some components of a web element classification component, according to embodiments of the present disclosure.

FIG. 11 illustrates some components of the web element classification component 720. The web element classification component 720 may classify the bounding boxes and potential HTML elements in two different ways. In one way, the label space is a web action, which is the actions a user can perform using the website 604a, such as, click, type, select, etc. In the other way, the label space is a semantic action representing an action/task a user may be interested in performing, such as, check in, find locations, submit, search, etc. The web element classification component 720 may process semantic action(s) data 1102 and the predicted boxes data 712. The semantic actions data 1102 may be text data representing a list of actions, and may be predetermined based on information available for the domain corresponding to the website 604a. For example, if the domain is configured to schedule hair salon appointments, the semantic actions data 1102 may include the following actions: find salon, select service, select stylist, request appointment time, submit appointment request, etc.

The web element classification component 720 may process the semantic action(s) data 1102 using a text encoder 1110 to generate encoded text data 1112. The text encoder 1110 may be one or more machine learning models, such as, a neural network. The text encoder 1110 may process each action included in the semantic actions data 1102, may generate a vector including encoded text data corresponding to an action, and may combine the respective encoded text data to include in the encoded text data 1112. As such, the encoded text data 1112 may be a matrix with a dimension matching the number of actions included in the semantic actions data 1102. Alternatively, the web element classification component 720 may process an individual action from the semantic actions data 1102 at a time, and the encoded text data 1112 may be a vector corresponding to one action from the semantic actions data 1102.

The web element classification component 720 may process the predicted boxes data 712 using an image encoder 1120 to determine encoded image data 1122. In this case, the predicted boxes data 712 may include annotated image of the website 604a, where the annotated image includes indications of the identified bounding boxes. The image encoder 1120 may be one or more machine learning models, such as, a neural network. The image encoder 1120 may process each bounding box identified in the predicted boxes data 712, may generate a vector including encoded image data corresponding to the bounding box, and may combine the respective encoded image data to include in the encoded image data 1122. As such, the encoded image data 1122 may be a matrix with a dimension matching the number of bounding boxes included in the predicted boxes data 712. Alternatively, the web element classification component 720 may process an individual bounding box from the predicted boxes 712 at a time, and the encoded image data 1122 may be a vector corresponding to one bounding box from the predicted boxes data 712.

The web element classification component 720 may process the encoded text data 1112 and the encoded image data 1122 using a classifier model 1130, which may be one or more machine learning models. The classifier model 1130 may be configured to determine a correspondence between the semantic action in the semantic action(s) data 1102 and the bounding box in the predicted boxes data 712. The classifier model 1130 may be trained/configured using training data including annotated images of multiple different websites, where the annotated images may include an annotation of a semantic action for at least some of the HTML elements in the website. The classifier model 1130 may output action-box pair(s) 1132, where one instance of the action-box pair 1132 represents a semantic action corresponding to a bounding box. For example, if the predicted boxes data 712 includes a bounding box surrounding a button labeled "Locations" and the semantic action(s) data 1102 includes a {find location} semantic action, the action-box pair 1132 may include representation of the "Locations" bounding box (e.g., pixel data, longitudes and latitudes, etc.) and text data representing "find location."

Figure 12:
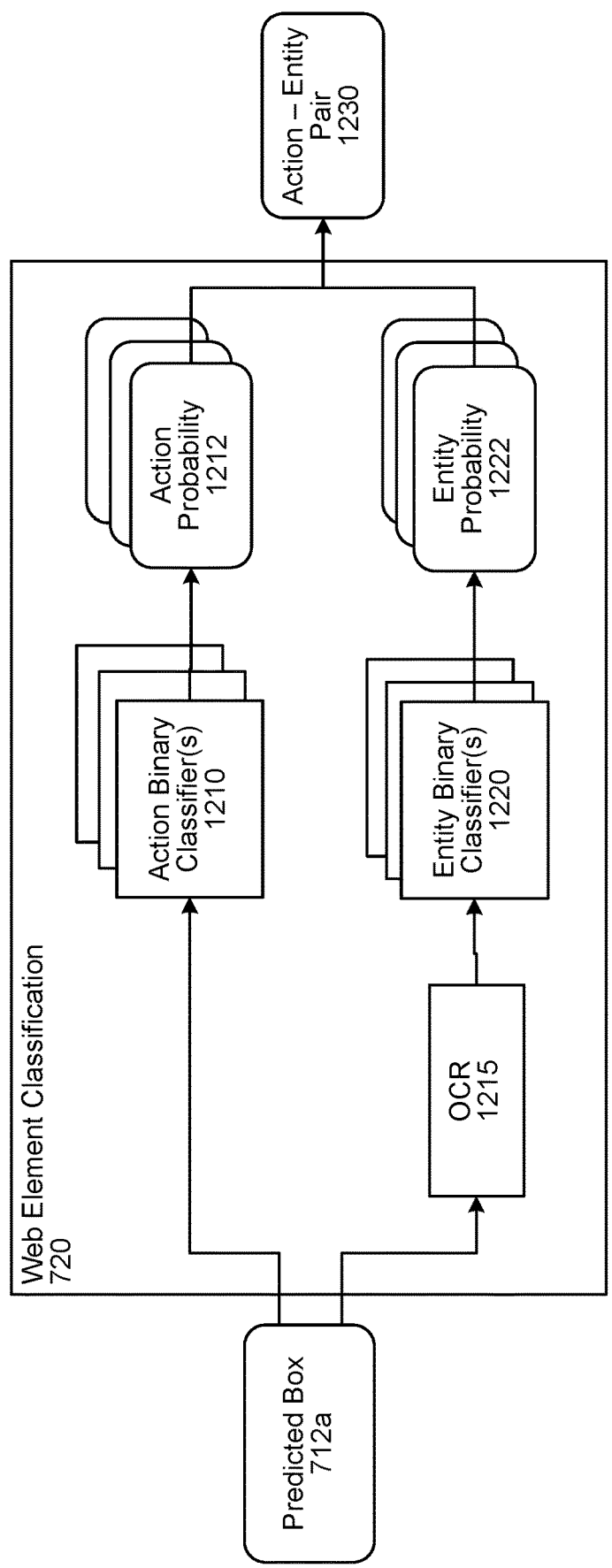
FIG. 12 is a conceptual diagram illustrating additional components a web element classification component, according to embodiments of the present disclosure.

FIG. 12 illustrates some additional components of the web element classification component 720. The components shown in FIG. 12 may be used to identify web actions and entities corresponding to a bounding box. The predicted box data 712a may be a portion of an image of the website 604a, where the portion corresponds to an identified bounding box. The predicted box 712a may be processed using an Optical Character Recognition (OCR) component 1215 to identify text from the predicted box data 712a. The output of the OCR component 1215 may be processed using one or more entity binary classifiers 1220. An entity binary classifier 1220 may correspond to one entity, for example, an entity that may relate to the semantic action 1102 described above, and may be configured to determine whether the particular entity corresponds to the predicted box 712a or not. For example, for a hair service domain and hair salon website 604a, a first entity binary classifier 1220a may be configured to determine (a probability/score indicating a likelihood) that the predicted box 712a corresponds to "locations" entity, a second entity binary classifier 1220b may be configured to determine (a probability/score indicating a likelihood) that the predicted box 712a corresponds to "services" entity, etc. The entities for the entity binary classifiers 1220 may be based on entities stored in the domain settings storage 640 for the domain corresponding to the website 604a. Alternatively, these entities may be based on the semantic actions 1102.

The predicted box data 712a may also be processed using one or more action binary classifiers 1210 to determine whether a web action corresponds to the predicted box data 712a. One action binary classifier 1210a may be configured to determine whether or not a click web action corresponds to the predicted box data 712a. Another action binary classifier 1210b may be configured to determine whether or not a typing web action corresponds to the predicted box data 712a. Yet another action binary classifier 1210c may be configured to determine whether or not a select web action corresponds to the predicted box data 712a. The web element classification component 720 may include additional action binary classifiers corresponding to other web actions. Based on processing by the action binary classifiers 1210, one or more instances of an action probability 1212 may be determined. The action probability 1212 may be a probability/score representing a likelihood of the predicted box data 712a corresponding to the respective web action. Each of the action probabilities 1212 may be an output from a different action binary classifier 1210.

Based on which action probability 1212 and which entity probability 1222 satisfies a condition (e.g., exceeds a threshold value), the web element classification component 720 may determine action-entity pair 1230 corresponding to the predicted box data 712a. For example, based on the action probability 1212 corresponding to a click web action satisfying a condition, and the entity probability 1222 corresponding to a first entity satisfying a condition, the web element classification component 720 may determine the action-entity pair 1230 to include an indication of the click web action and a representation of the first entity.

Figure 13:
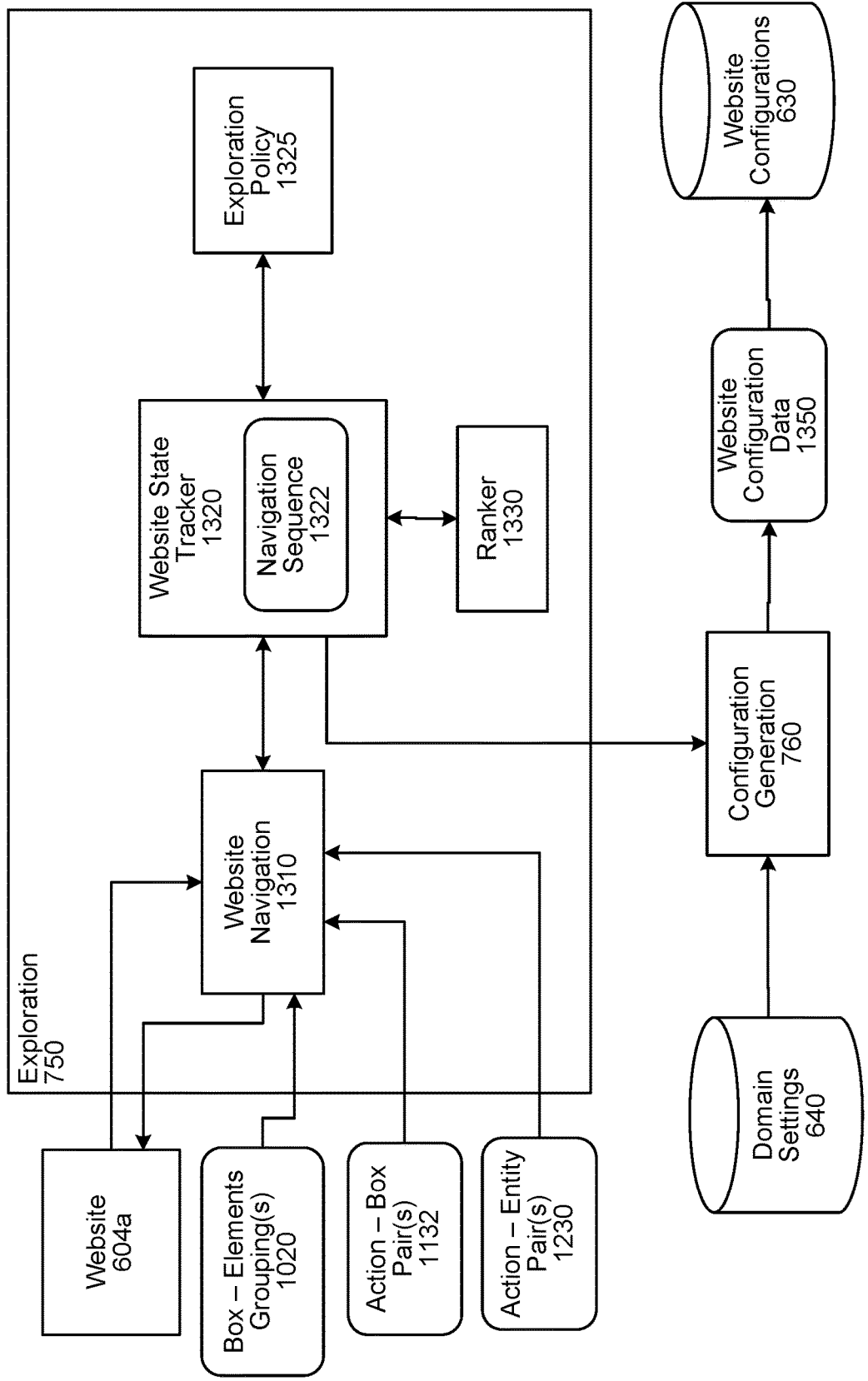
FIG. 13 is a conceptual diagram illustrating an exploration component, according to embodiments of the present disclosure.

Within a typical website, one may need to navigate multiple web pages in order to complete a goal. When all web elements are identified from the website 604a, the content understanding component 620 may interact with those web elements to complete the goal. Such interactions may be performed by the exploration component 750. FIG. 13 illustrates components of the exploration component 750. In example embodiments, the exploration component 750 may include a website navigation component 1310, a website state tracker 1320, an exploration policy component 1325 and a ranker 1330.

In some embodiments, the exploration component 750 may employ a heuristic-based exploration strategy, where a website 604 is explored top to bottom, page-by-page. In other embodiments, the exploration component 750 may employ a statistical exploration strategy to complete the goal and allow for non-linear navigation of the website 604. An example statistical exploration strategy may be a Partially observable Markov decision process (POMDP). Such exploration strategies may be implemented at the exploration policy component 1325.

For interacting with each web element, the exploration policy component 1325 may also implement reusable policies, which may correspond to web actions, for example, read, select, click, type, etc., rather than using semantic level information, such as find locations, zip code, wait time, submit button, etc. Using reusable policies at the web action level lends itself to statistical exploration of websites with an optional reward function.

The website navigation component 1310 may take as inputs the box-elements groupings 1020 (determined as described in relation to FIG. 10), the action-box pairs 1132 (determined as described in relation to FIG. 11) and the action-entity pairs 1230 (determined as described in relation to FIG. 12). In other words, the website navigation component 1310 may receive an indication of which HTML elements correspond to a particular bounding box, which semantic action corresponds to the particular bounding box, and which web action and entity is represented in the particular bounding box. Based on the received data, the website navigation component 1310 may select to perform an action with respect to the website 604a. The website navigation component 1310 may cause performance of the selected action at the website 604a, and may determine the website response to the action. The website navigation component 1310 may provide the selected action and the website response to the website state tracker 1320.

In some embodiments, the exploration component 750 may perform actions to undo/cancel any tasks performed at the website 604a as part of the exploring the website during the build time process. For example, to explore how a hair appointment may be submitted at the website 604a, the web navigation component 1310 may click on certain buttons and tabs, enter certain information, and then finally click a "submit" or "request appointment" button, which causes scheduling of a hair service appointment. After the website response is received, the exploration component 750 may perform actions to cancel the hair service appointment. Such actions may also be tracked to generate a navigation sequence for the goal of canceling a hair appointment. Web configuration data corresponding to this goal may be stored separately in the web configurations storage 630, and may be identified with the respective goal.

The website state tracker 1320 may track the website's 604a state/response based on the website navigation component 1310 performing actions at the website 604a. Based on the website navigation component 1310 navigating the website 604a, the website state tracker 1320 may determine a navigation sequence 1322 to achieve the goal. In some embodiments, the website state tracker 1320 may select an action to be performed at the website 604a based on data (e.g., exploration strategy, reusable policies, etc.) available at the exploration policy component 1325. The website state tracker 1320 may provide the selected action to the website navigation component 1310 to perform. Once the goal is achieved, the website state tracker 1320 may determine the final navigation sequence 1322. In some embodiments, the website state tracker 1320 may determine the final navigation sequence using the ranker component 1330, which may be configured to determine the best navigation path for completing the goal. The best navigation path may be the shortest navigation path—i.e. the path requiring the least number of interactions with the website, or the path requiring the least number of inputs from a user. The ranker component 1330 may filter or prune the navigation sequence explored by the website navigation component 1310 to remove any actions that did not progress towards goal completion.

The navigation sequence 1322 may be provided to the configuration generation component 760. The configuration generation component 760 may generate website configuration data 1350, which may be stored at the website configurations storage 630 and may be used by the content interaction skill component 192 during runtime processing of user inputs as described above in relation to FIG. 1. While the exploration component 750 explores the website 604a, the state of the website is tracked and updated. Based on the exploration, the website state tracker 1320 records the sequence of web pages that has been explored, all of the web elements that have been interacted with, and associated information such as the type of the web elements. When the goal is completed (e.g., click on submit button and a confirmation page is returned), the configuration generation component 760 may be triggered to generate and store the website configuration data 1350. The exploration component 750 may send a signal/command to the configuration generation component 760, along with the navigation sequence 1322.

The configuration generation component 760 may process the navigation sequence 1322 and the domain settings 640 to determine various information to be included in the website configuration data 1350. Such information may include required fields (i.e. fields that require an input to achieve the goal, such as, location, day/time, service, etc.) on the website 604a, web actions taken (e.g., click, select, type, etc.), entity information included in the website 604a (e.g., types of services offered, etc.), a URL for each web page of the website 604a accessed to complete the goal, etc. Such information may relate to completion of the goal. In other embodiments, the website configuration data 1350 may also include information not necessarily used to complete a goal. For example, for a hair salon website 604a, the goal may be to book an appointment for a hair service (e.g., any of the services offered by the salon). The website configuration data 1350 may include information indicating which web elements need to be interacted with to book an appointment (e.g., click on "find location", select a service from a dropdown, select a stylist, select from available appointment times, and click "submit" button"). The website configuration data 1350 may also include information regarding other web pages of the website 604a that may not be needed to book the appointment. For example, such information may be the web page that provides customer reviews, the web page that describes the hair salon, the web page that provides contact information, etc. Such information may be used by the content interaction skill component 192 to respond to user inputs that may request other information from the website 604a.

The website configuration data 1350 may be associated with the website 604a (e.g., using an identifier for the website 604a; an identifier such as a website name, a website URL, an alphanumerical identifier, etc.) in the website configurations storage 630.

The content understanding component 620 may process another website 604b as described above in relation to FIGS. 7-13, and generate and store additional website configuration data 1350 associated with the website 604b. The websites 604, processed by the content understanding component 620, may relate to the same domain/goal. For example, the websites 604 may be websites for various hair salons that enable a user to book/reserve an appointment for a hair service (e.g., haircut, hair color, hair blowout, etc.). The website configuration data 1350 for the websites 604 relating to the same domain may be further associated with a domain identifier (e.g., domain name, an alphanumerical identifier, etc.), so that the content interaction skill component 192 may retrieve the appropriate website configuration data 1350 based on which domain the user input corresponds to. As another example, the websites 604 may be websites for various food delivery services that enable a user to request delivery of food items, and the corresponding domain may be food delivery. As yet another example, the websites 604 may be websites for various vehicle parking reservations that enable a user to reserve a parking spot for a vehicle, and the corresponding domain may be car parking.

The content understanding component 620 may include additional components, which may be configured to process the other types of content 605, in a similar manner as described above, and generate content configuration data stored at the content configuration storage 625. The content configuration storage 625 may include data representing a sequence of actions to perform at an application to complete a goal, entities represented in different portions of the application, an application response generated in response to performance of an action, etc.

Referring to FIG. 1, as described above, the system 120 may perform processing to facilitate user input processing and generation of an output responsive to the user input. A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 1420 (shown in FIG. 14). The wakeword detection component 1420 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 1420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 1420 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 1420 detects a wakeword, the device 110 may "wake" and begin transmitting audio data 1411, representing the audio, to the system 120. The audio data 1411 may include the detected wakeword, or the device 110 may remove the portion of the audio data, corresponding to the detected wakeword, prior to sending the audio data 1411 to the system 120.

Referring to FIG. 1, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 1411 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the dialog management component 160.

In some embodiments, the system 120 may include an NLU component, and the orchestrator 130 may send the ASR output data to the NLU component. The NLU component processes the ASR output data or text data to determine one or more NLU hypotheses embodied in NLU output data. The NLU component may perform intent classification (IC) processing on the ASR output data or text data to determine an intent of the natural language input. An intent corresponds to an action to be performed that is responsive to the natural language input. To perform IC processing, the NLU component may communicate with a database of words linked to intents. For example, a music intent database may link words and phrases such as "quiet," "volume off," and "mute" to a <Mute> intent. The NLU component identifies intents by comparing words and phrases in ASR output data or text data to the words and phrases in an intents database. In some embodiments, the NLU component may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component may be linked to one or more grammar frameworks with entity types to be populated with entity values. Each entity type of a grammar framework corresponds to a portion of ASR output data or text data that the NLU component believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component may perform NER processing to identify words in ASR output data or text data as subject, object, verb, preposition, etc. based on grammar rules and/or models. Then, the NLU component may perform IC processing using the identified verb to identify an intent. Thereafter, the NLU component may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component may generate NLU output data including one or more NLU hypotheses, with each NLU hypothesis including an intent and optionally one or more entity types and corresponding entity values. In some embodiments, the NLU component may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component). In at least some embodiments, the system 120 may implement a spoken language understanding (SLU) component configured to process audio data 1411 to determine NLU output data.

The SLU component may be equivalent to a combination of the ASR component 150 and the NLU component. Yet, the SLU component may process audio data 1411 and directly determine the NLU output data, without an intermediate step of generating ASR output data. As such, the SLU component may take audio data 1411 representing a spoken natural language input and attempt to make a semantic interpretation of the spoken natural language input. That is, the SLU component may determine a meaning associated with the spoken natural language input and then implement that meaning. For example, the SLU component may interpret audio data 1411 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skill systems 125. A "skill" may refer to software, that may be placed on a machine or a virtual machine (e.g., software that may be launched in a virtual instance when called), configured to perform one or more actions in response to user inputs processed by the dialog management component 160.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill 125, the orchestrator component 130, or another component of the system 120.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 1411. The user recognition component 195 may perform user recognition by comparing speech characteristics, in the audio data 1411, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 14:
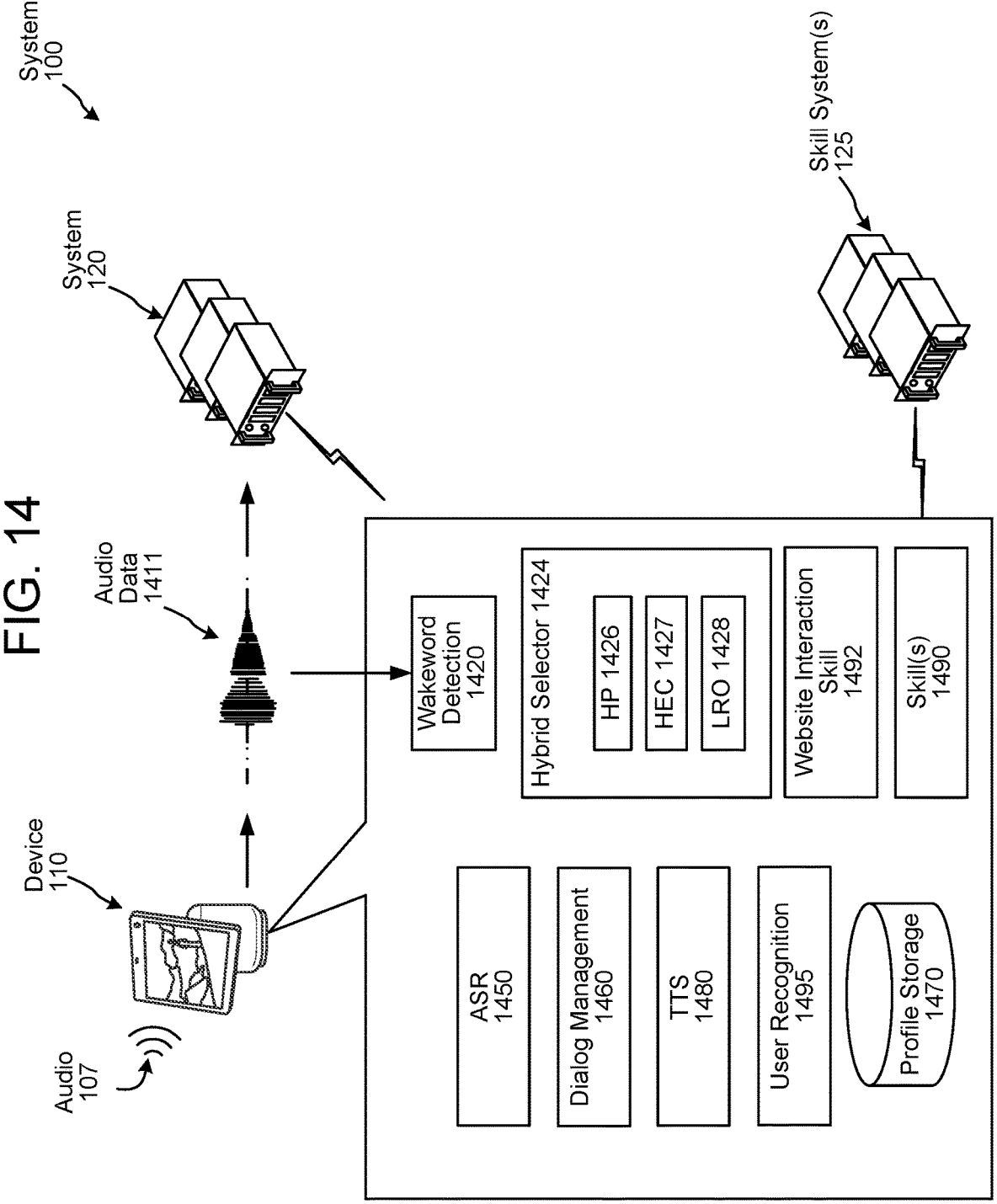
FIG. 14 is a conceptual diagram illustrating components that may be included in a device, according to embodiments of the present disclosure.

The foregoing describes illustrative components and processing of the system 120. The following describes illustrative components and processing of the device 110. As illustrated in FIG. 14, in at least some embodiments the system 120 may receive audio data 1411 from the device 110, to recognize speech corresponding to a spoken natural language in the received audio data 1411, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 1420 configured to detect a wakeword (e.g., "Alexa") that indicates to the device 110 that the audio data 1411 is to be processed for determining NLU output data. In at least some embodiments, a hybrid selector 1424, of the device 110, may send the audio data 1411 to the wakeword detection component 1420. If the wakeword detection component 1420 detects a wakeword in the audio data 1411, the wakeword detection component 1420 may send an indication of such detection to the hybrid selector 1424. In response to receiving the indication, the hybrid selector 1424 may send the audio data 1411 to the system 120 and/or an on-device ASR component 1450. The wakeword detection component 1420 may also send an indication, to the hybrid selector 1424, representing a wakeword was not detected. In response to receiving such an indication, the hybrid selector 1424 may refrain from sending the audio data 1411 to the system 120, and may prevent the ASR component 1450 from processing the audio data 1411. In this situation, the audio data 1411 can be discarded.

The device 110 may conduct its own speech processing using on-device language processing components (such as an on-device SLU component, an on-device ASR component 1450, and/or an on-device NLU component) similar to the manner discussed above with respect to the system-implemented ASR component 150, and NLU component. The device 110 may also internally include, or otherwise have access to, other components such as one or more skills 1490 (which may process similar to the skill components 190), a content interaction skill component 1492 (which may process similar to the content interaction skill component 192), a user recognition component 1495 (configured to process in a similar manner to the system-implemented user recognition component 195), profile storage 1470 (configured to store similar profile data to the system-implemented profile storage 170), a TTS component 1480 (configured to process in a similar manner to the system-implemented TTS component 180), and other components. One or more of the components may be customized/personalized for a user (or group of users) of the device 110. In at least some embodiments, the on-device profile storage 1470 may only store profile data for a user or group of users specifically associated with the device 110.

The device 110 may also include a dialog management component 1460 that may be configured to perform operations similar to the dialog management component 160, may include similar components to the dialog management component 160 described above, and may be personalized for the user 105 of the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 1424, of the device 110, may include a hybrid proxy (HP) 1426 configured to proxy traffic to/from the system 120. For example, the HP 1426 may be configured to send messages to/from a hybrid execution controller (HEC) 1427 of the hybrid selector 1424. For example, command/directive data received from the system 120 can be sent to the HEC 1427 using the HP 1426. The HP 1426 may also be configured to allow the audio data 1411 to pass to the system 120 while also receiving (e.g., intercepting) this audio data 1411 and sending the audio data 1411 to the HEC 1427.

In at least some embodiments, the hybrid selector 1424 may further include a local request orchestrator (LRO) 1428 configured to notify the ASR component 1450 about the availability of the audio data 1411, and to otherwise initiate the operations of on-device language processing when the audio data 1411 becomes available. In general, the hybrid selector 1424 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 1411 is received, the HP 1426 may allow the audio data 1411 to pass through to the system 120 and the HP 1426 may also input the audio data 1411 to the ASR component 1450 by routing the audio data 1411 through the HEC 1427 of the hybrid selector 1424, whereby the LRO 1428 notifies the ASR component 1450 of the audio data 1411. At this point, the hybrid selector 1424 may wait for response data from either or both the system 120 and/or the on-device language processing components. However, the disclosure is not limited thereto, and in some examples the hybrid selector 1424 may send the audio data 1411 only to the ASR component 1450 without departing from the disclosure. For example, the device 110 may process the audio data 1411 on-device without sending the audio data 1411 to the system 120.

The ASR component 1450 is configured to receive the audio data 1411 from the hybrid selector 1424, and to recognize speech in the audio data 1411, and the on-device NLU component is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component) may be selected as usable to respond to a natural language input, and local response data may be sent (e.g., local NLU output data, local knowledge base information, internet search results, and/or local directive data) to the hybrid selector 1424, such as a "ReadyToExecute" response. The hybrid selector 1424 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 1411 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 15:
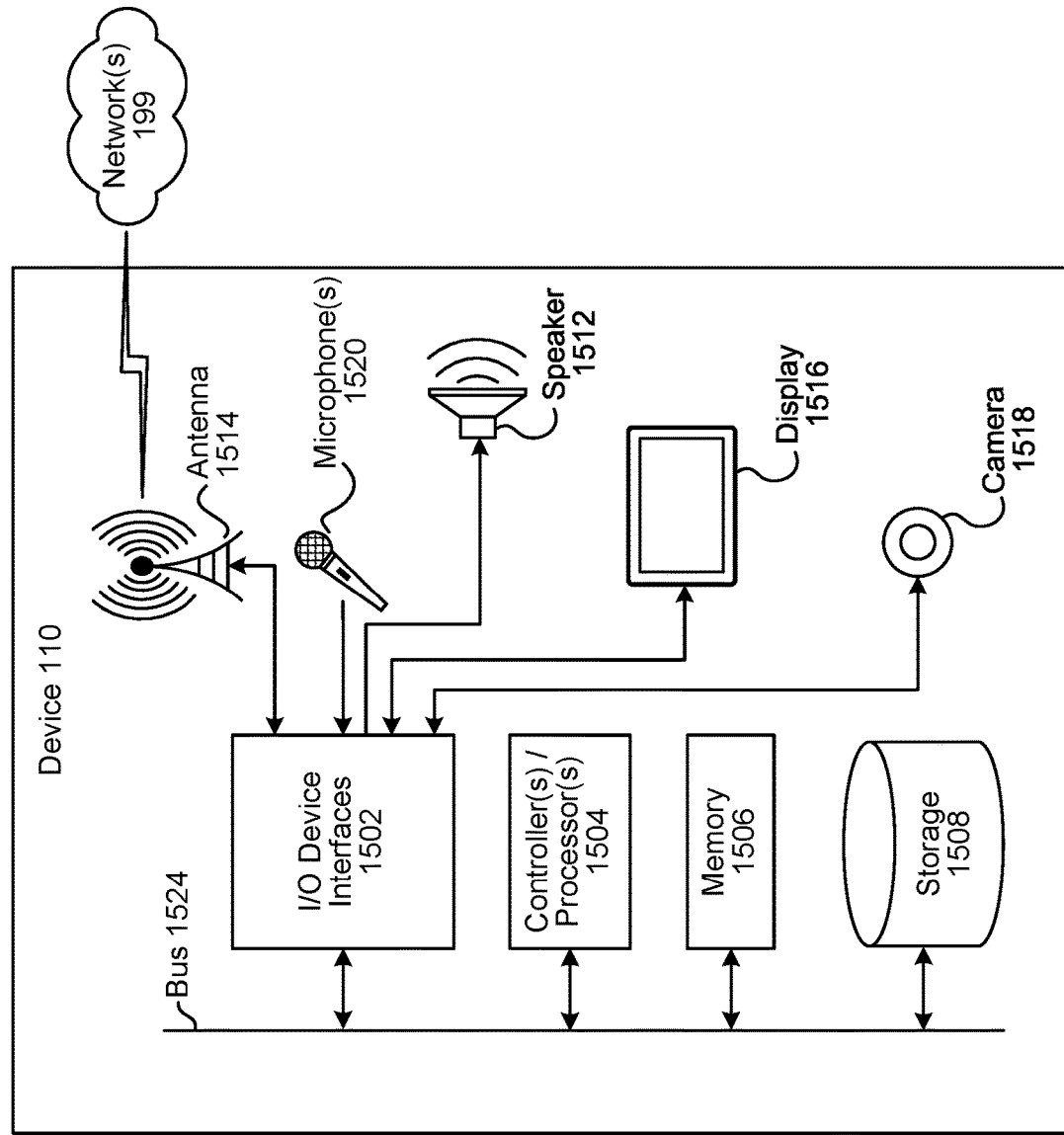
FIG. 15 is a block diagram conceptually illustrating example components of a device, according to embodiments of the present disclosure.
Figure 16:
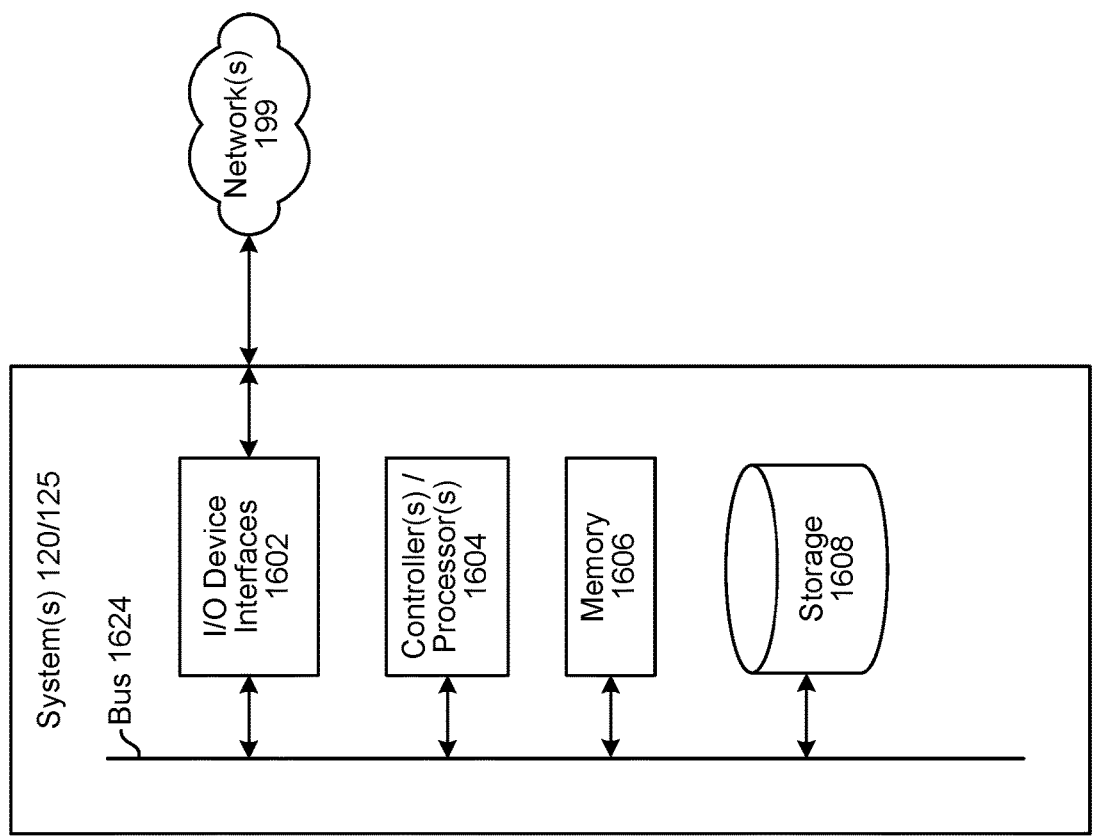
FIG. 16 is a block diagram conceptually illustrating example components of a system, according to embodiments of the present disclosure.

FIG. 15 is a block diagram conceptually illustrating a device 110 of the system 100. FIG. 16 is a block diagram conceptually illustrating example components of a system, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (1504/1604), which may each include a central processing unit (CPU) for processing data and computer-readable instructions, and a memory (1506/1606) for storing data and instructions of the respective device. The memories (1506/1606) may individually include volatile random access memory (RAM), non-volatile read only memory (ROM), non-volatile magnetoresistive memory (MRAM), and/or other types of memory. Each device (110/120/125) may also include a data storage component (1508/1608) for storing data and controller/processor-executable instructions. Each data storage component (1508/1608) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1502/1602).

Computer instructions for operating each device (110/120/125) and its various components may be executed by the respective device's controller(s)/processor(s) (1504/1604), using the memory (1506/1606) as temporary "working" storage at runtime. A device's computer instructions may be stored in a non-transitory manner in non-volatile memory (1506/1606), storage (1508/1608), or an external device(s). Alternatively, some or all of the executable instructions may be embedded in hardware or firmware on the respective device in addition to or instead of software.

Each device (110/120/125) includes input/output device interfaces (1502/1602). A variety of components may be connected through the input/output device interfaces (1502/1602), as will be discussed further below. Additionally, each device (110/120/125) may include an address/data bus (1524/1624) for conveying data among components of the respective device. Each component within a device (110/120/125) may also be directly connected to other components in addition to (or instead of) being connected to other components across the bus (1524/1624).

Referring to FIG. 15, the device 110 may include input/output device interfaces 1502 that connect to a variety of components such as an audio output component such as a speaker 1512, a wired headset or a wireless headset (not illustrated), or other component capable of outputting audio. The device 110 may also include an audio capture component. The audio capture component may be, for example, a microphone 1520 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1516 for displaying content. The device 110 may further include a camera 1518.

Via antenna(s) 1514, the input/output device interfaces 1502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1502/1602) may also include communication components that allow data to be exchanged between devices such as different physical servers in a collection of servers or other components.

The components of the device 110, the system 120 and/or skill 125 may include their own dedicated processors, memory, and/or storage. Alternatively, one or more of the components of the device 110, the system 120 and/or skill 125 may utilize the I/O interfaces (1502/1602), processor(s) (1504/1604), memory (1506/1606), and/or storage (1508/1608) of the device 110, the system 120 and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120 and the skill system 125, as described herein, are illustrative, and may be located as a stand-alone device or may be included, in whole or in part, as a component of a larger device or system.

Figure 17:
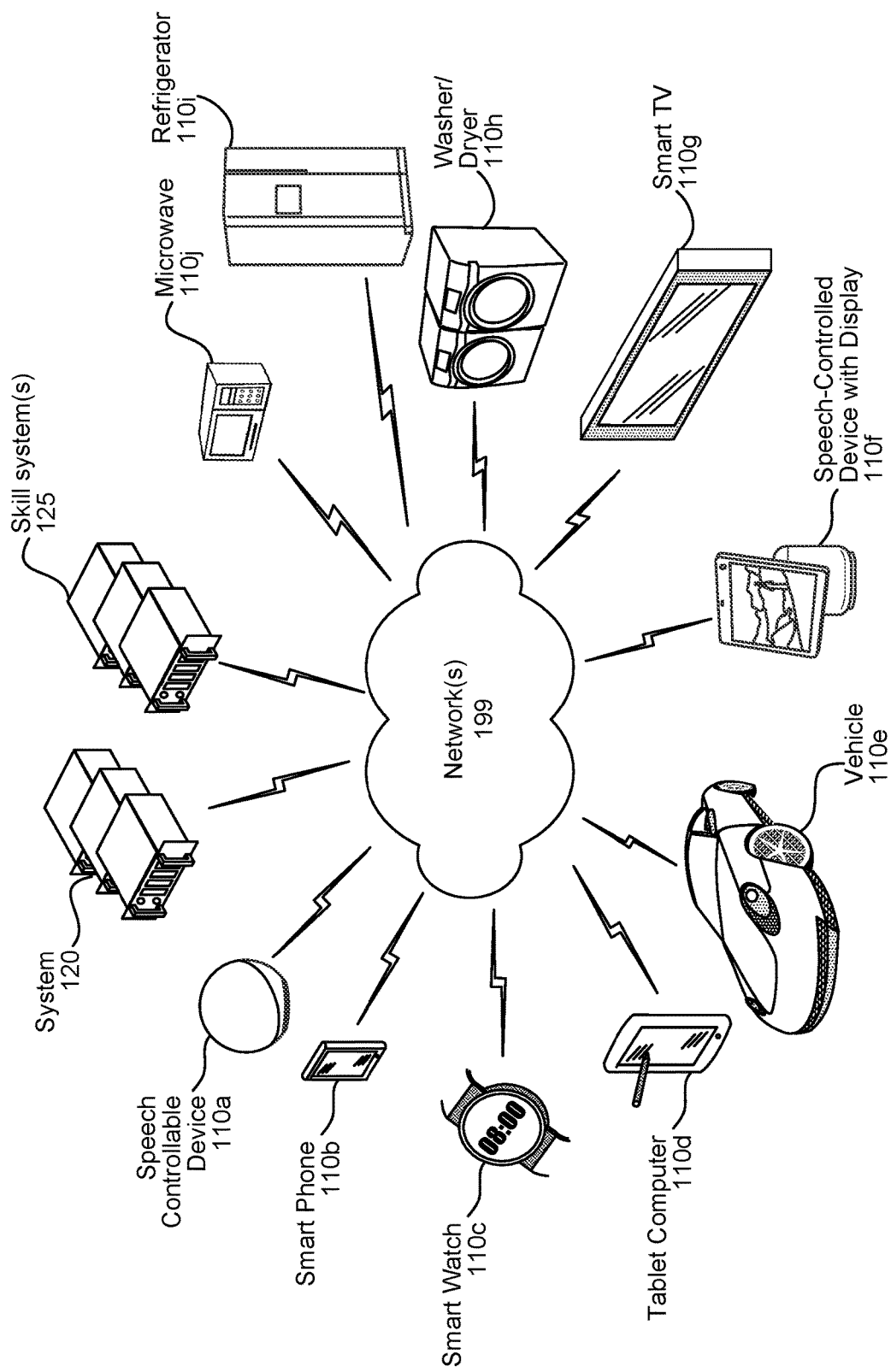
FIG. 17 illustrates an example of a computer network for use with the overall system, according to embodiments of the present disclosure.

As illustrated in FIG. 17, multiple devices (110a-110j, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110a, a smart phone 110b, a smart watch 110c, a tablet computer 110d, a vehicle 110e, a speech-controllable display device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving first input data representing a first natural language input, the first input data associated with a first dialog session identifier for a first dialog session;
determining, using the first input data, that the first natural language input corresponds to a first action to be performed;
determining that first configuration data is associated with performance of the first action by a first application, the first configuration data identifying at least a first operation and a second operation that are to be performed by a browser application to cause the first application to perform the first action, the first operation corresponding to a first interface element presented by the browser application and the second operation corresponding to a second interface element presented by the browser application, wherein the first interface element is presented by the browser application based on first data received from the first application and the second interface element is presented by the browser application based on second data received from the first application, and wherein performance of the first operation and the second operation causes third data to be sent to the first application to cause the first application to perform the first action;
causing, based at least in part on the first natural language input corresponding to the first action and the first configuration data being associated with the performance of the first action by the first application, the browser application to perform at least the first operation and the second operation to cause the third data to be sent to the first application;
receiving, from the first application, first response data corresponding to performance of the first action;
determining first output data based at least in part on the first response data; and
causing a device to present the first output data in response to the first natural language input.

2. The computer-implemented method of claim 1, further comprising:
determining a domain corresponding to the first natural language input;
determining one or more dialog models corresponding to the domain; and
determining, using the one or more dialog models, the first action corresponding to the first natural language input.

3. The computer-implemented method of claim 1, further comprising:
receiving second input data representing a second natural language input, the second input data associated with a second dialog session identifier for a second dialog session;
determining, using the second input data, that the second natural language input corresponds to a second action to be performed;
determining that second configuration data is associated with performance of the second action by a second application, the second configuration data identifying at least a third operation and a fourth operation that are to be performed by the browser application to cause the second application to perform the second action, the third operation corresponding to a third interface element presented by the browser application and the fourth operation corresponding to a fourth interface element presented by the browser application, wherein the third interface element is presented by the browser application based on fourth third data received from the second application and the fourth interface element is presented by the browser application based on fifth data received from the second application, and wherein performance of the third operation and the fourth operation causes sixth causing fourth data to be sent to the second application to cause the second application to perform the second action; and causing, based at least in part on the second natural language input corresponding to the second action and the second configuration data being associated with the performance of the second action by the second application, the browser application to perform at least the third operation and the fourth operation to cause the sixth data to be sent to the second application.

4. The computer-implemented method of claim 1, further comprising:

storing dialog state data including at least the first input data, the first action and the first output data; and storing content state data including at least an identifier corresponding to the first application, the first operation, and the first response data.

5. The computer-implemented method of claim 1, wherein the first response data includes information provided by the first application to the browser application in response to the first operation, and the method further comprises:

determining the first output data to include the information;

determining second output data representing a description of the information;

determining output audio data representing synthesized speech corresponding to the second output data;

causing the device to display the first output data; and causing the device to output the output audio data.

6. The computer-implemented method of claim 1, further comprising prior to receiving the first input data:

determining a plurality of interface elements presented by the browser application based on fourth data received from the first application, the first interface element and the second interface element being among the plurality of interface elements;

determining a plurality of operations to be performed by the browser application based on the fourth data, the first operation and the second operation being among the plurality of operations;

determining that performance of at least the first operation and the second operation by the browser application causes the first action to be performed by the first application; and determining the first configuration data to indicate an association among the first interface element, the first operation, the second interface element, the second operation, and the first action.

7. The computer-implemented method of claim 6, further comprising:

determining, using the first configuration data, that the first action corresponds to a sequence of operations to be performed by the browser application, wherein the sequence of operations includes at least the first operation and the second operation, and each of the sequence of operations corresponds to a respective one of the plurality of interface elements; and causing, based at least in part on the first natural language input corresponding to the first action and the first configuration data being associated with the performance of the first action by the first application, the browser application to perform the sequence of operations to cause the first application to perform the first action.

8. The computer-implemented method of claim 1, further comprising:

receiving second input data representing a second natural language input, the second input data associated with a second dialog session identifier for a second dialog session;

determining, using the second input data, that the second natural language input corresponds to a second action to be performed;

determining that second configuration data is associated with performance of the second action by the first application, the second configuration data identifying at least a third operation and a fourth operation that are to be performed by the browser application to cause the first application to perform the second action, the third operation corresponding to a third interface element presented by the browser application and the fourth operation corresponding to a fourth interface element presented by the browser application, wherein the third interface element is presented by the browser application based on fourth data received from the first application and the fourth interface element is presented by the browser application based on fifth data received from the first application, and wherein performance of the third operation and the fourth operation causes sixth data to be sent to the first application to cause the first application to perform the second action; and causing, based at least in part on the second natural language input corresponding to the second action and the second configuration data being associated with the performance of the second action by the first application, the browser application to perform at least the third operation and the fourth operation to cause the sixth data to be sent to the first application.

9. The computer-implemented method of claim 1, further comprising:

determining user profile data corresponding to the first input data, wherein the first action is caused to be performed by the first application using at least a portion of the user profile data;

determining that performance of the second operation by the browser application corresponds to additional data;

determining that the device is associated with the user profile data;

sending, based at least in part on the device being associated with the user profile data, a request to the device for the additional data;

receiving the additional data from the device; and causing, based at least in part on the first configuration data, the additional data to be included in the third data that is sent to the first application.

10. A system comprising:

at least one processor; and at least one memory including instructions that, when executed by the at least one processor, cause the system to:

receive first input data representing a first natural language input, the first input data associated with a first dialog session identifier for a first dialog session;

determine, using the first input data, that the first natural language input corresponds to a first action to be performed;

determine that first configuration data is associated with performance of the first action by a first application, the first configuration data identifying at least a first operation and a second operation that are to be performed by a browser application to cause the first application to perform the first action, the first operation corresponding to a first interface element presented by the browser application and the second operation corresponding to a second interface element presented by the browser application, wherein the first interface element is presented by the browser application based on first data received from the first application and the second interface element is presented by the browser application based on second data received from the first application, and wherein performance of the first operation causes third data to be sent to the first application to cause the first application to perform the first action;

cause, based at least in part on the first natural language input corresponding to the first action and the first configuration data being associated with the performance of the first action by the first application, the browser application to perform at least the first operation and the second operation to cause the third data to be sent to the first application;

receive, from the first application, first response data corresponding to performance of the first action;

determine first output data based at least in part on the first response data; and cause a device to present the first output data in response to the first natural language input.

11. The system of claim 10, wherein the at least one memory includes further instructions that, when executed by the at least one processor, further cause the system to:

determine a domain corresponding to the first natural language input;

determine one or more dialog models corresponding to the domain; and determine, using the one or more dialog models, the first action corresponding to the first natural language input.

12. The system of claim 10, wherein the at least one memory includes further instructions that, when executed by the at least one processor, further cause the system to:

receive second input data representing a second natural language input, the second input data associated with a second dialog session identifier for a second dialog session;

determine, using the second input data, that the second natural language input corresponds to a second action to be performed;

determine that second configuration data is associated with performance of the second action by a second application, the second configuration data identifying at least a third operation and a fourth operation that are to be performed by the browser application to cause the second application to perform the second action, the third operation corresponding to a third interface element presented by the browser application and the fourth operation corresponding to a fourth interface element presented by the browser application, wherein the third interface element is presented by the browser application based on fourth data received from the second application and the fourth interface element is presented by the browser application based on fifth data received from the second application, and wherein performance of the third operation and the fourth operation causes sixth data to be sent to the second application to cause the second application to perform the second action; and cause, based at least in part on the second natural language input corresponding to the second action and the second configuration data being associated with the performance of the second action by the second application, the browser application to perform at least the third operation and the fourth operation to cause the sixth data to be sent to the second application.

13. The system of claim 10, wherein the at least one memory includes further instructions that, when executed by the at least one processor, further cause the system to:

store dialog state data including at least the first input data, the first action and the first output data; and store content state data including at least an identifier corresponding to the first application, the first operation, and the first response data.

14. The system of claim 10, wherein the first response data includes information provided by the first application to the browser application in response to the first operation, and wherein the at least one memory includes further instructions that, when executed by the at least one processor, further cause the system to:

determine the first output data to include the information;

determine second output data representing a description of the information;

determine output audio data representing synthesized speech corresponding to the second output data;

cause the device to display the first output data; and cause the device to output the output audio data.

15. The system of claim 10, wherein the at least one memory includes further instructions that, when executed by the at least one processor, further cause the system to, prior to receiving the first input data:

determine a plurality of interface elements presented by the browser application based on fourth data received from the first application, the first interface element and the second interface element being among the plurality of interface elements;

determine a plurality of operations to be performed by the browser application based on the fourth data, the first operation and the second operation being among the plurality of operations;

determine that performance of at least the first operation and the second operation by the browser application causes the first action to be performed by the first application; and determine the first configuration data to indicate an association among the first interface element, the first operation, the second interface element, the second operation, and the first action.

16. The system of claim 15, wherein the at least one memory includes further instructions that, when executed by the at least one processor, further cause the system to:

determine, using the first configuration data, that the first action corresponds to a sequence of operations to be performed by the browser application, wherein the sequence of operations includes at least the first operation and the second operation, and each of the sequence of operations corresponds to a respective one of the plurality of interface elements; and cause, based at least in part on the first natural language input corresponding to the first action and the first configuration data being associated with the performance of the first action by the first application, the browser application to perform the sequence of operations to cause the first application to perform the first action.

17. The system of claim 10, wherein the at least one memory includes further instructions that, when executed by the at least one processor, further cause the system to:

receive second input data representing a second natural language input, the second input data associated with a second dialog session identifier for a second dialog session;

determine, using the second input data, that the second natural language input corresponds to a second action to be performed;

determine that second configuration data is associated with performance of the second action by the first application, the second configuration data identifying at least a third operation and a fourth operation that are to be performed by the browser application to cause the first application to perform the second action, the third operation corresponding to a third interface element presented by the browser application and the fourth operation corresponding to a fourth interface element presented by the browser application, wherein the third interface element is presented by the browser application based on fourth data received from the first application and the fourth interface element is presented by the browser application based on fifth data received from the first application, and wherein performance of the third operation and the fourth operation causes sixth data to be sent to the first application to cause the first application to perform the second action; and cause, based at least in part on the second natural language input corresponding to the second action and the second configuration data being associated with the performance of the second action by the first application, the browser application to perform at least the third operation and the fourth operation to cause the sixth data to be sent to the first application.

18. The system of claim 10, wherein the at least one memory includes further instructions that, when executed by the at least one processor, further cause the system to:

determine user profile data corresponding to the first input data, wherein the first action is caused to be performed by the first application using at least a portion of the user profile data;

determine that performance of the second operation by the browser application corresponds to additional data;

determine that the device is associated with the user profile data;

send, based at least in part on the device being associated with the user profile data, a request to the device for the additional data;

receive the additional data from the device; and cause, based at least in part on the first configuration data, the additional data to be included in the third data that is sent to the first application.

* * * * *